United States Patent [19]
van der Lely

[11] 3,896,613
[45] July 29, 1975

[54] IMPLEMENTS FOR THE DISPLACEMENT OF CROP OR LIKE MATERIAL LYING ON THE GROUND

[76] Inventor: Ary van der Lely, 10, Weverskaile, Maasland, Netherlands

[22] Filed: July 12, 1973

[21] Appl. No.: 378,637

[30] Foreign Application Priority Data
July 13, 1972  Netherlands.................... 7209663

[52] U.S. Cl..................................... 56/370; 56/377
[51] Int. Cl............................................ A01d 79/00
[58] Field of Search....................... 56/370, 376, 377

[56] References Cited
UNITED STATES PATENTS

| | | | |
|---|---|---|---|
| 3,527,040 | 9/1970 | Teagle | 56/370 |
| 3,648,448 | 3/1972 | Maugg | 56/370 |
| 3,735,573 | 5/1973 | Dziuba et al. | 56/370 |

FOREIGN PATENTS OR APPLICATIONS

| | | | |
|---|---|---|---|
| 452,973 | 5/1968 | Switzerland | 56/370 |
| 804,473 | 3/1963 | France | 56/370 |
| 1,228,808 | 4/1971 | United Kingdom | 56/370 |
| 1,047,143 | 11/1966 | United Kingdom | 56/370 |

Primary Examiner—Louis G. Mancene
Assistant Examiner—J. N. Eskovitz
Attorney, Agent, or Firm—Mason, Mason & Albright

[57] ABSTRACT

A raking implement has rotary rakes which are mounted on upwardly extending shafts. Each rake includes groups of tines that are pivoted between extreme tangential and radical positions. The tines are pivoted by a steering assembly, a portion of which surrounds the upwardly extending shaft. The portion is adjustable with respect to the shaft to vary both the phase and the magnitude of pivoting by the tines during their rotation. The distance, angle and directions of rotation of the rakes can be changed so that the implement can function as a swath or windrow turner or side delivery rake.

44 Claims, 24 Drawing Figures

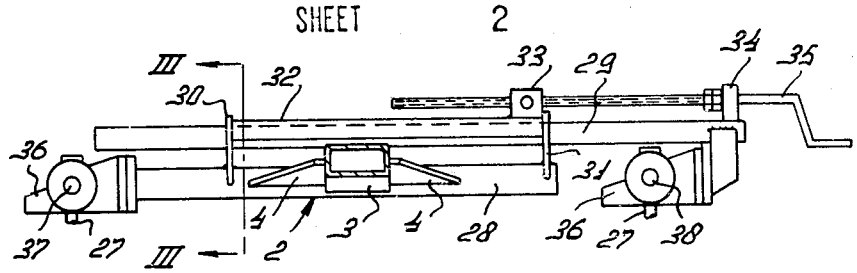
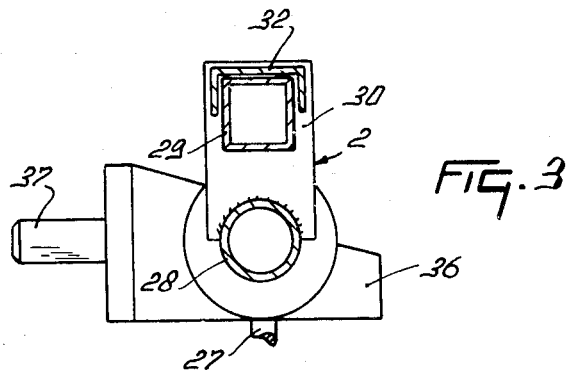
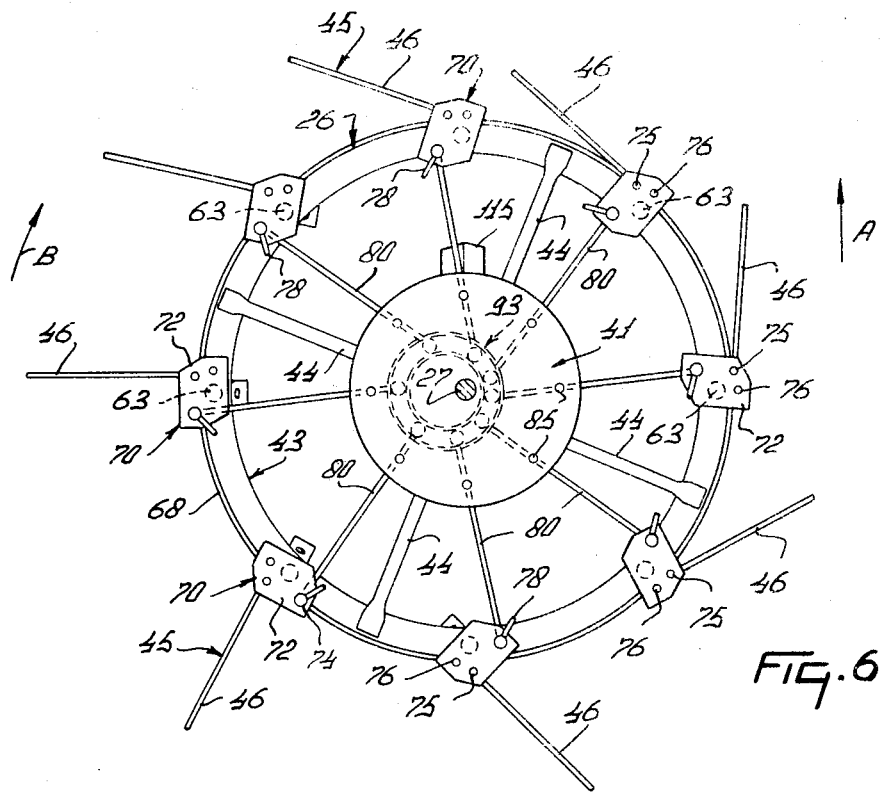

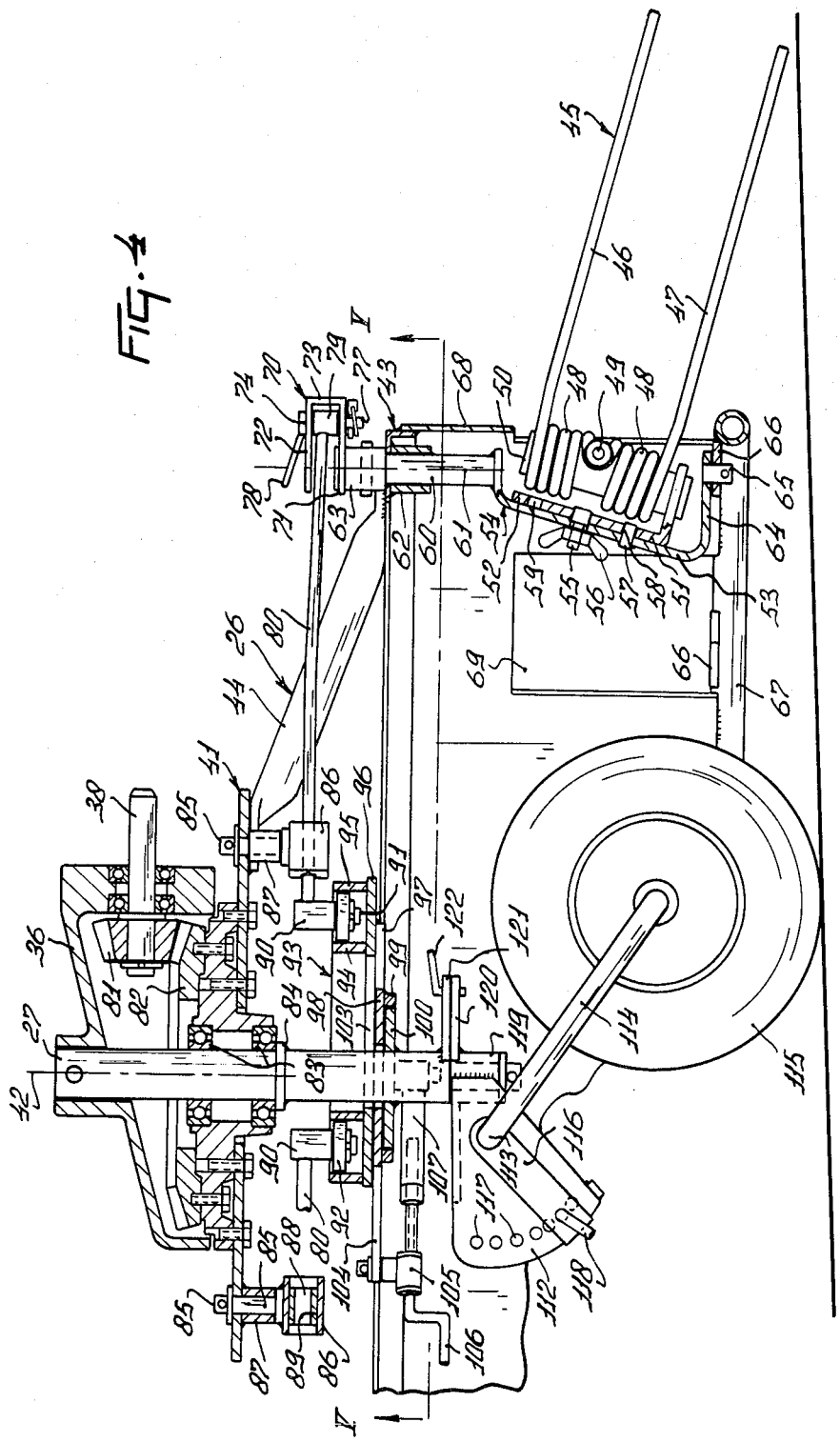

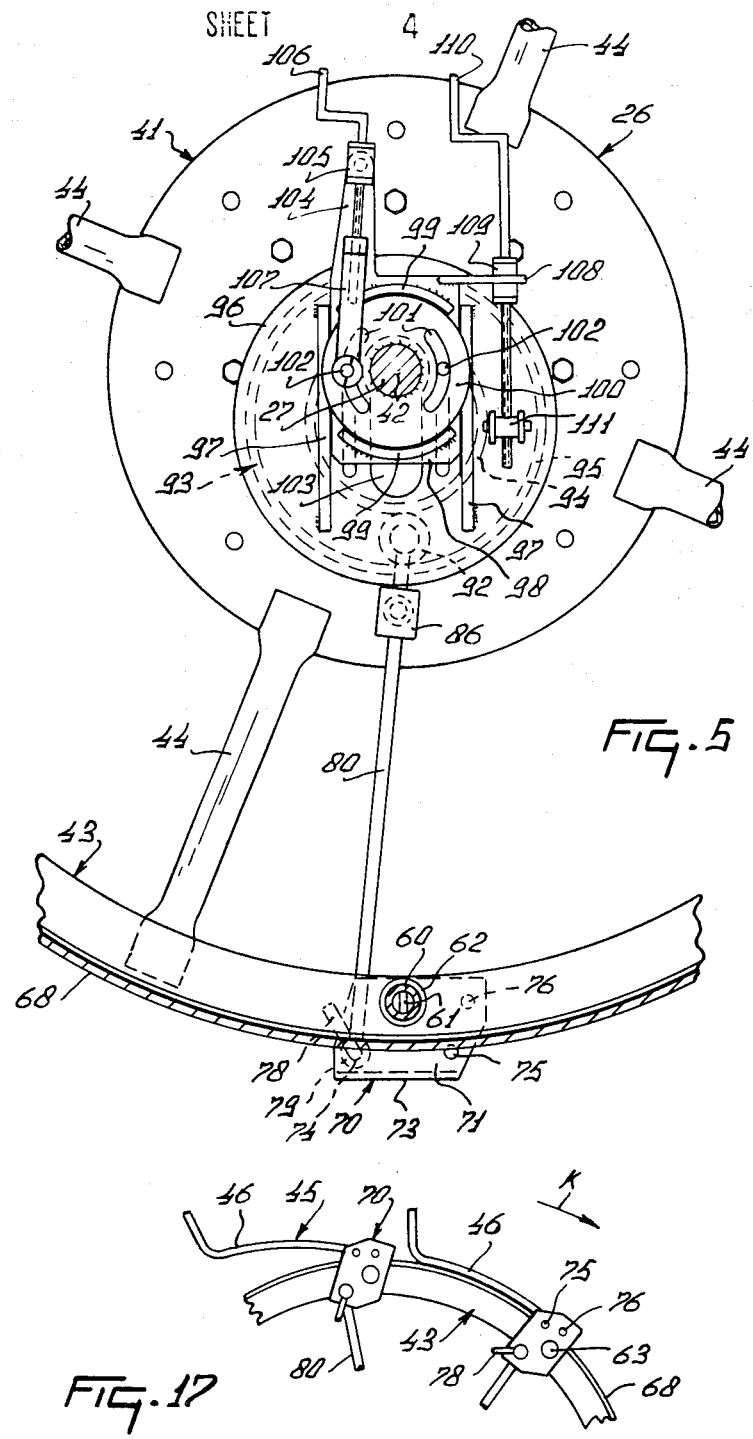

1

IMPLEMENTS FOR THE DISPLACEMENT OF CROP OR LIKE MATERIAL LYING ON THE GROUND

This invention relates to implements for the displacement of crop or like material lying on the ground, such implements being of the kind comprising a mobile frame, at least one rake member that is connected to the frame so as to be rotatable about a corresponding non-horizontal axis and a steering member that can be arranged to move at least parts of tines of the rake member about pivotal axes relative to further parts of the implement during rotation of the rake member.

According to one aspect of the invention, there is provided an implement of the kind set forth, wherein the steering member is constructed and arranged so as to be adjustable into an eccentric position relative to the axis of rotation of the rake member.

Figure 1:
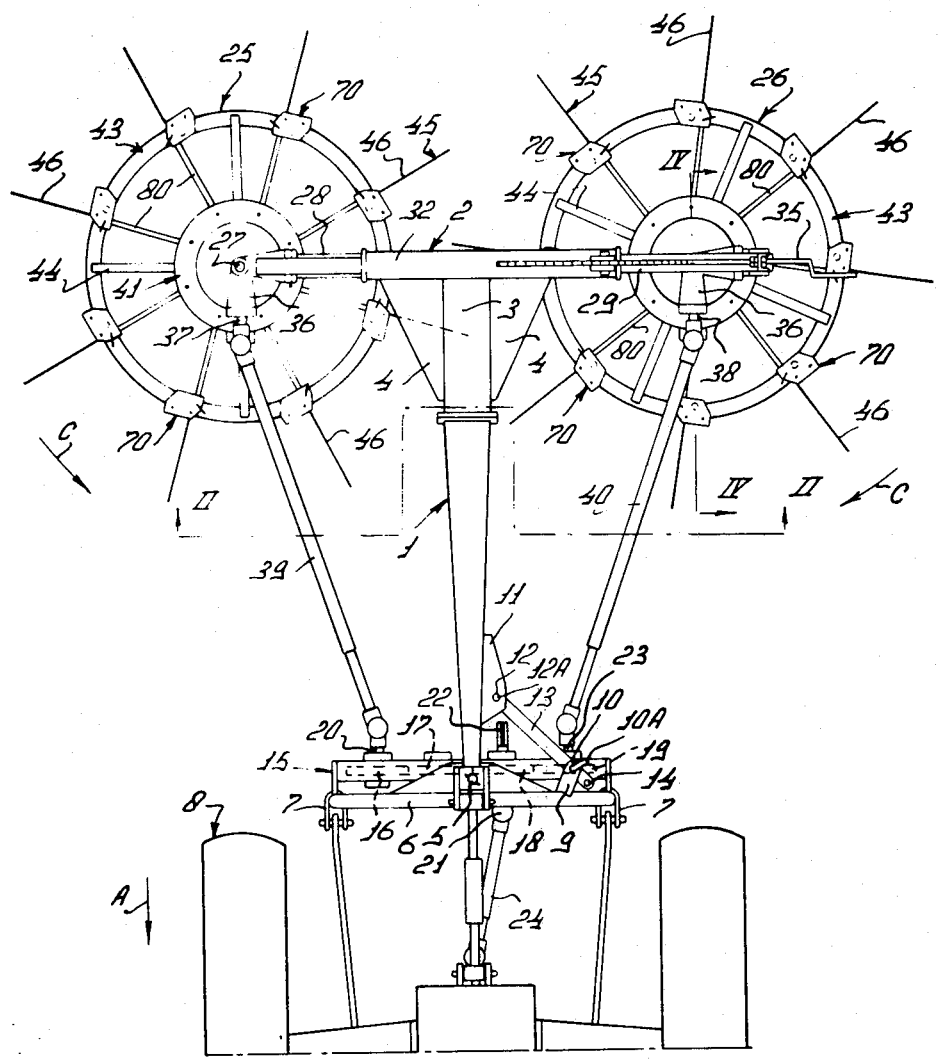
Figure 7:
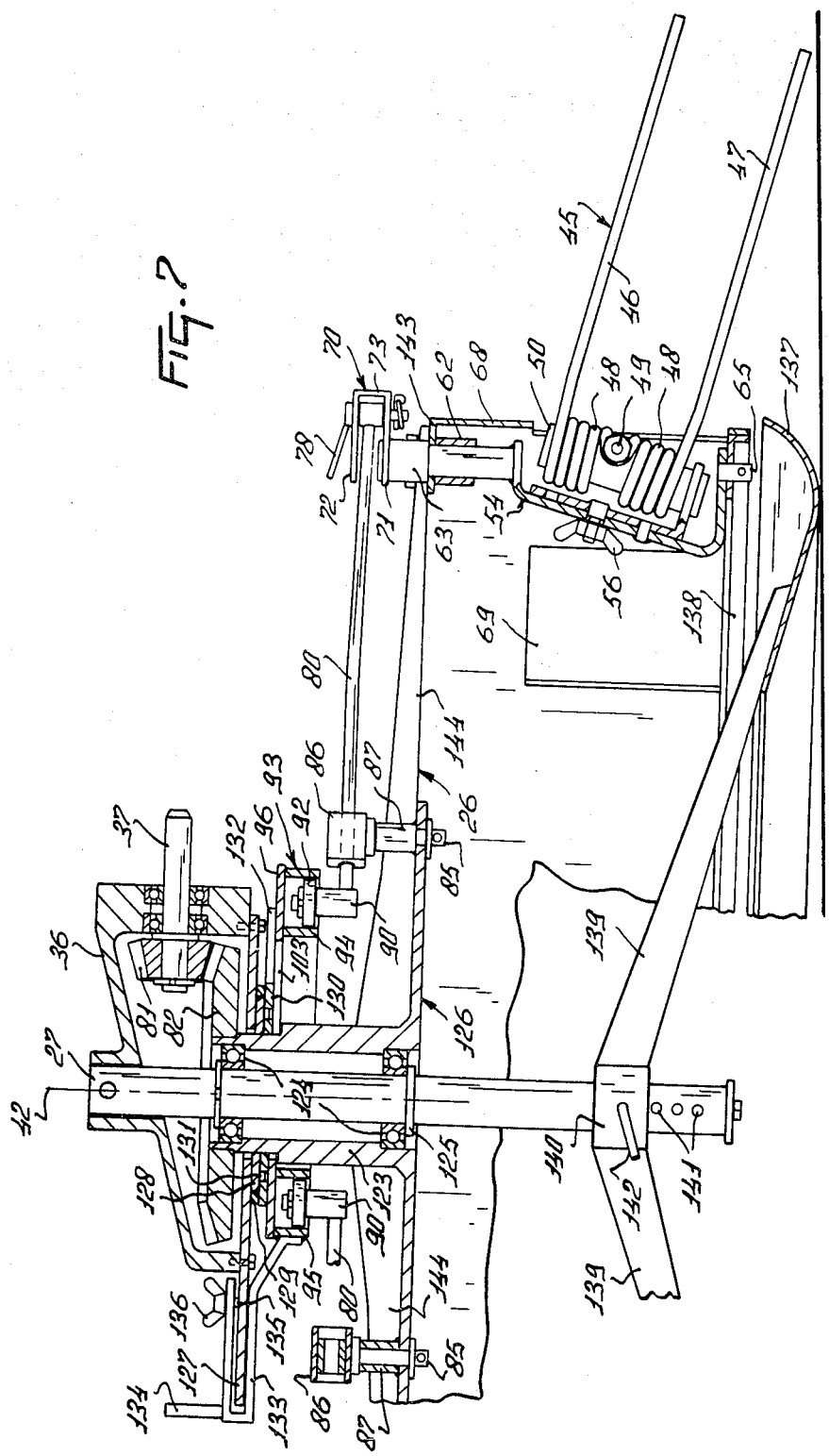
Figure 8:
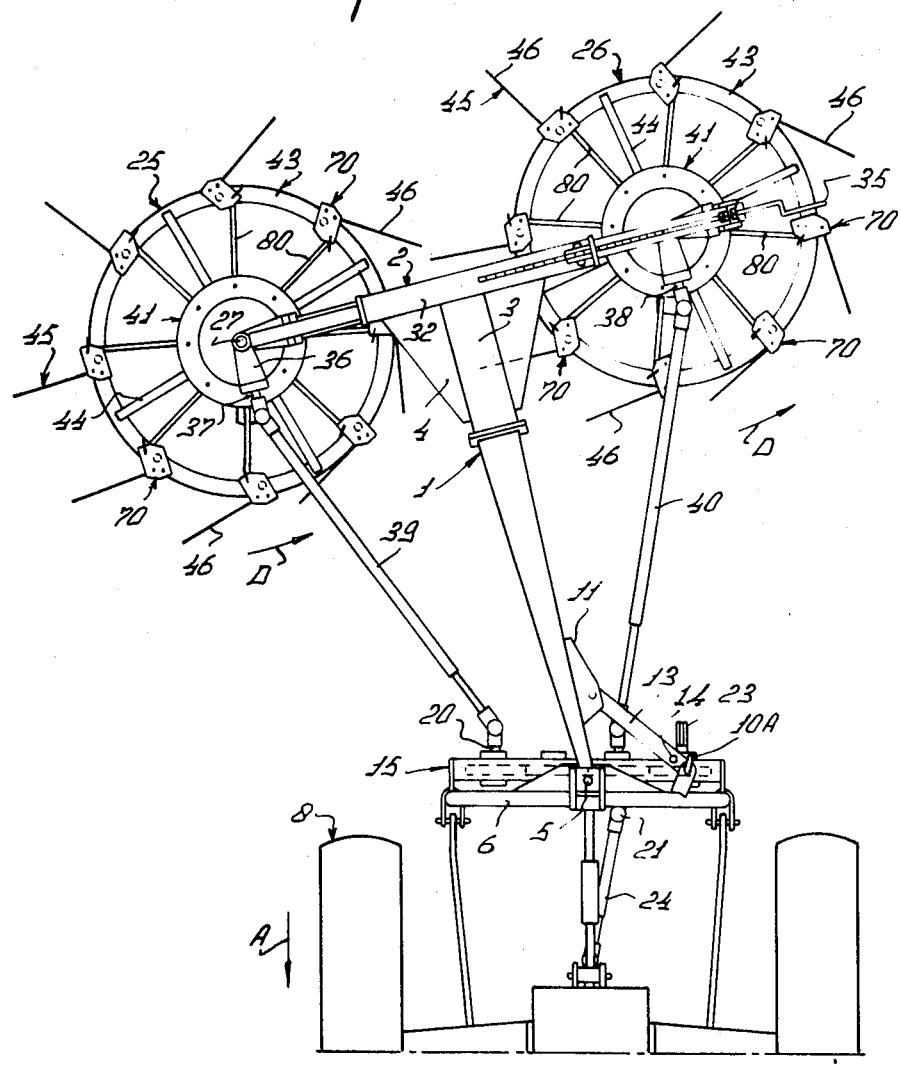
Figure 9:
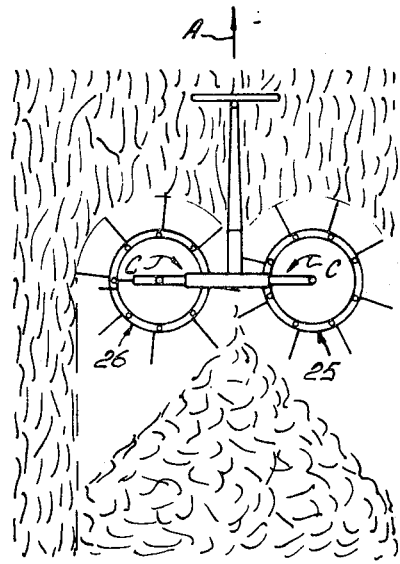
Figure 10:
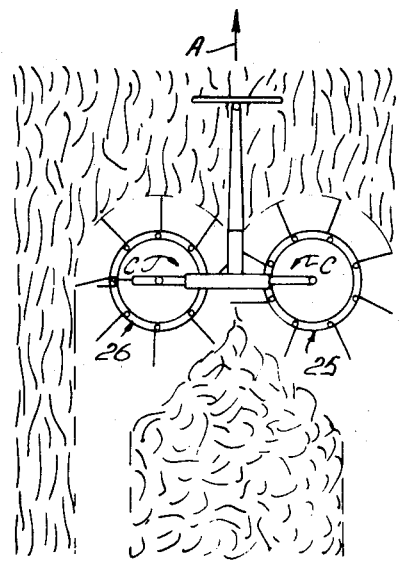
Figure 11:
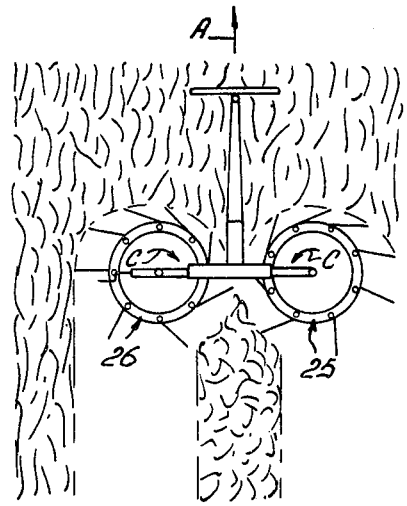
Figure 12:
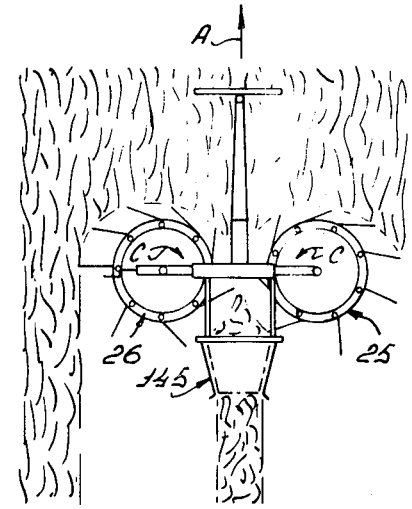
Figure 13:
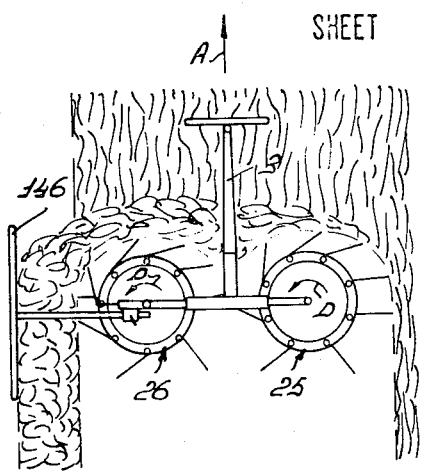
Figure 14:
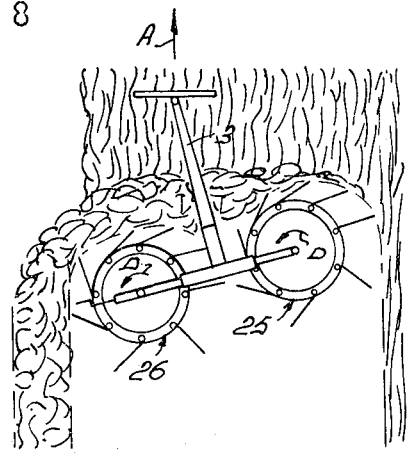
Figure 15:
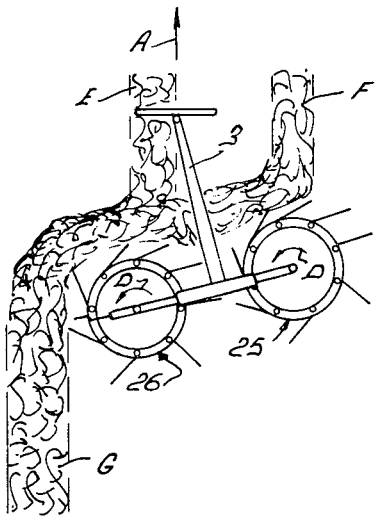
Figure 16:
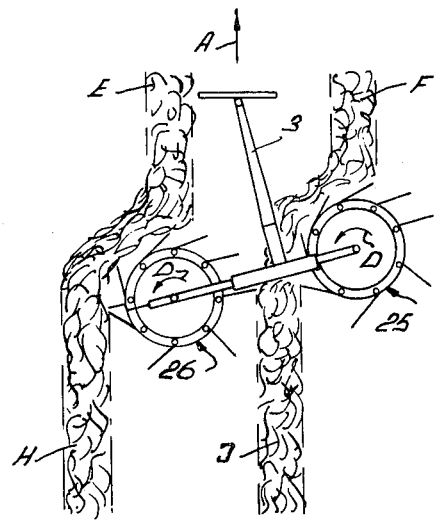
Figure 19:
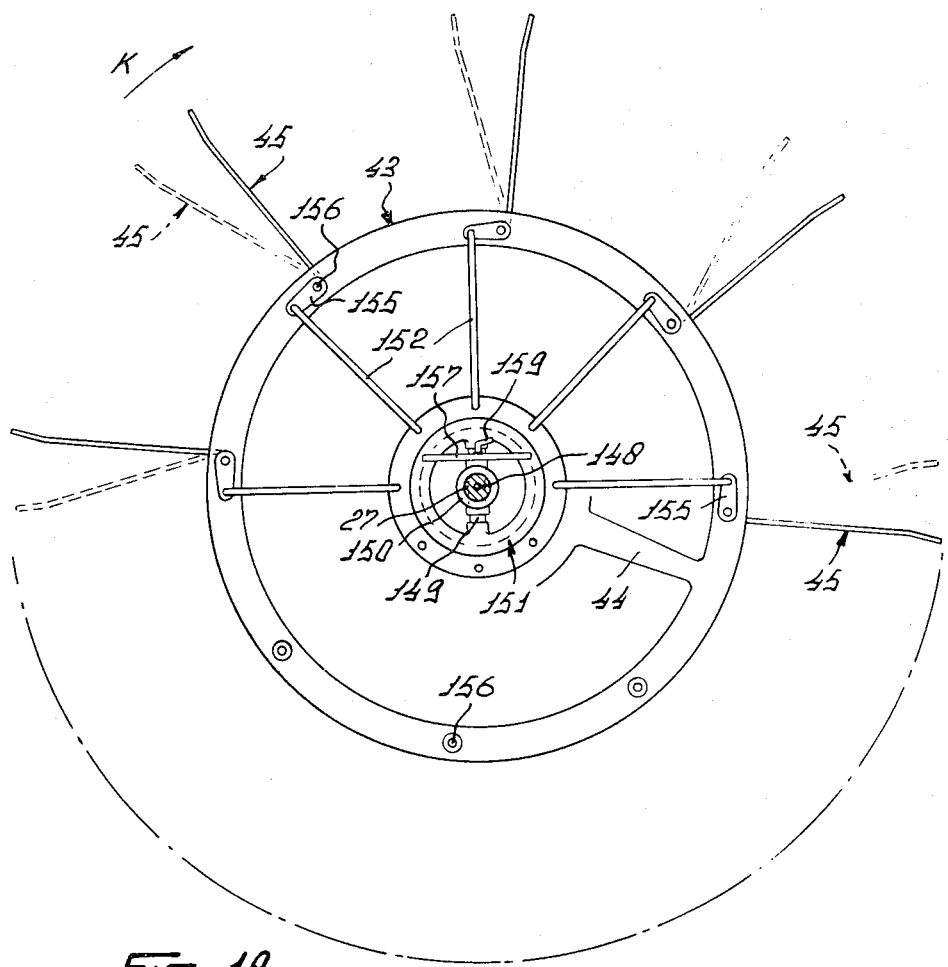
Figure 18:
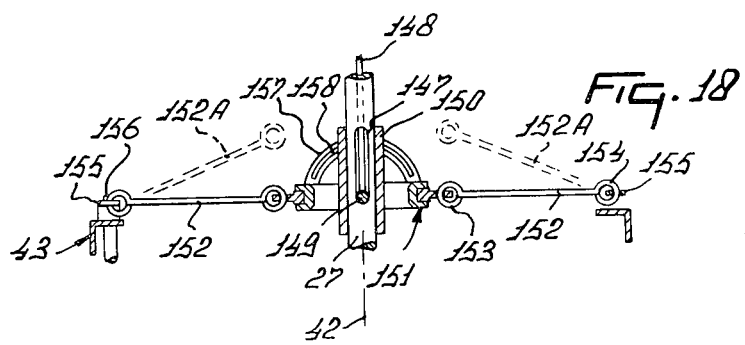
Figure 21:
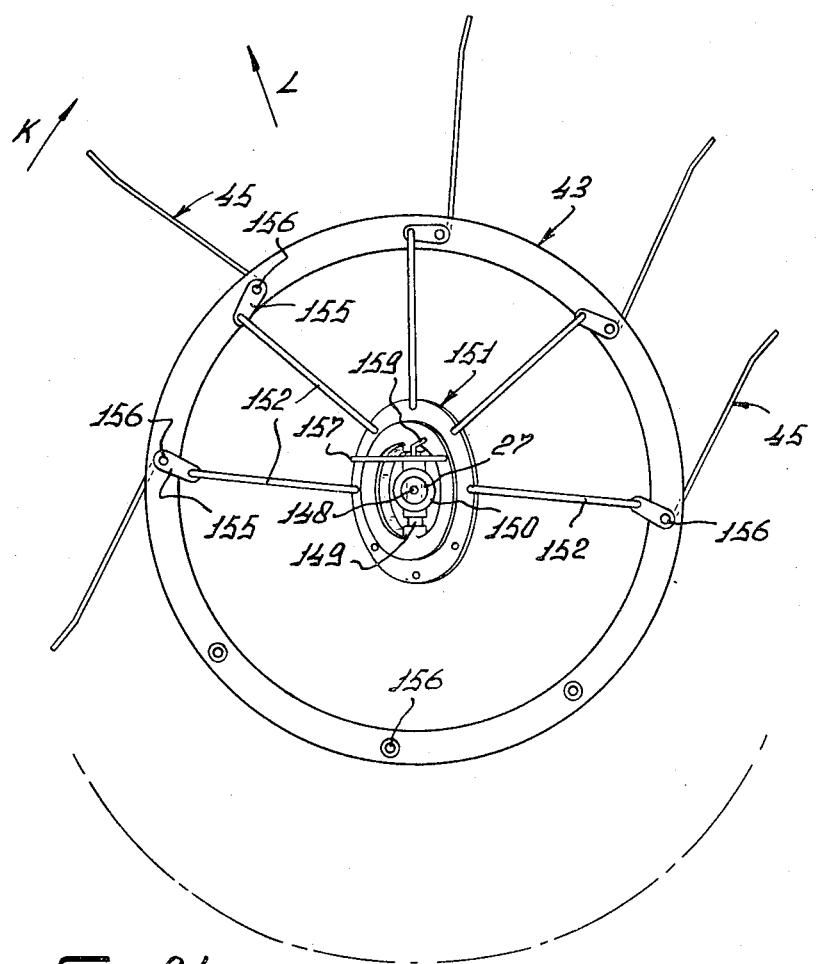
Figure 20:
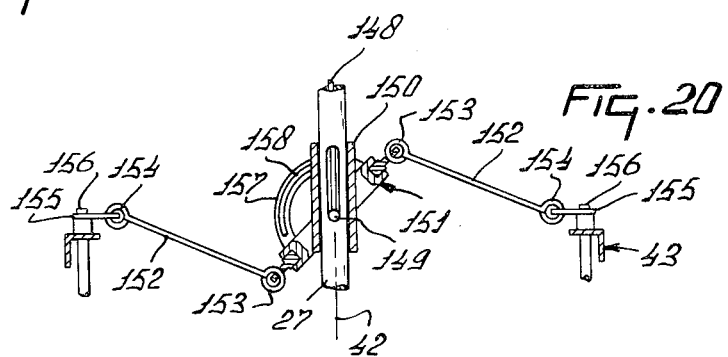
Figure 22:
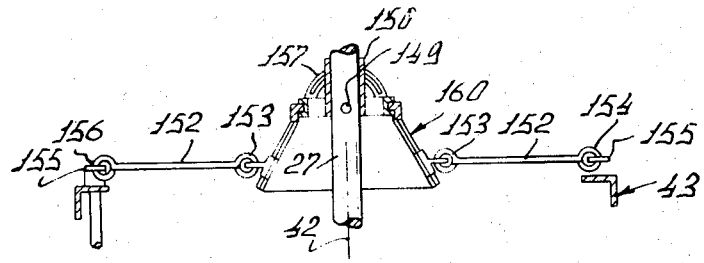
Figure 24:
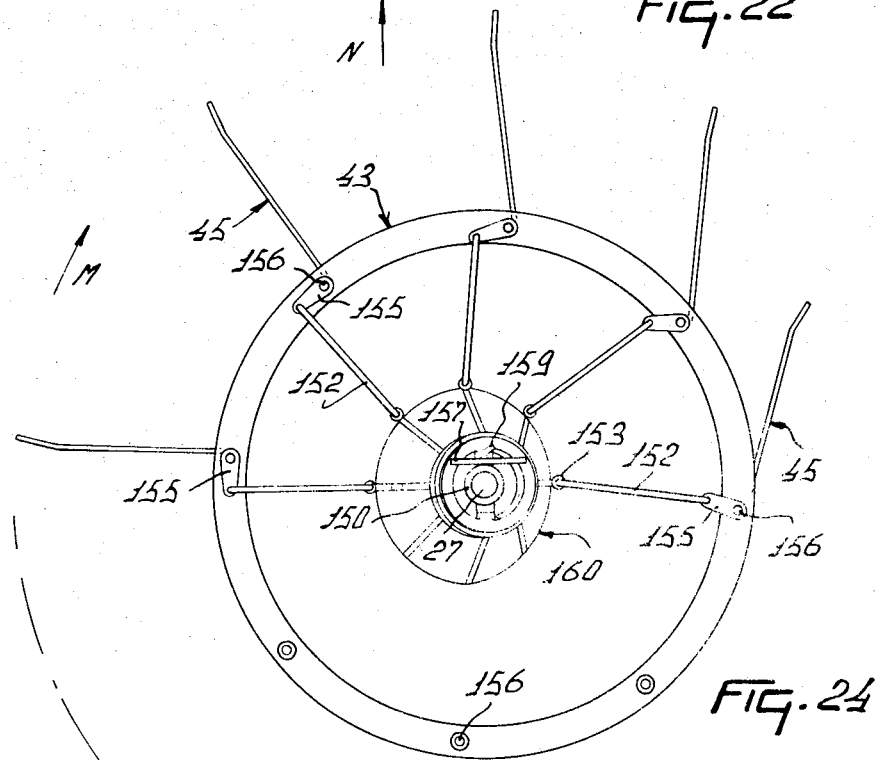
Figure 23:
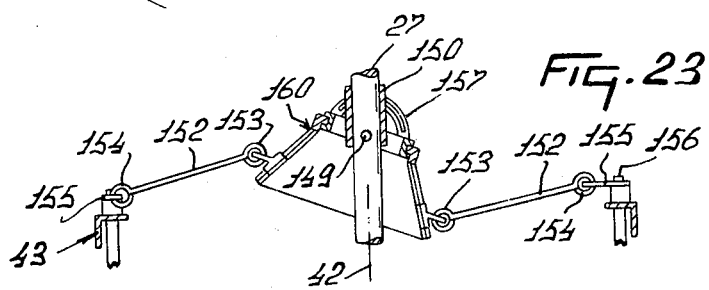

For a better understanding of the invention, and to show how the same may be carried into effect, reference will now be made, by way of example, to the accompanying drawings, in which:

FIG. 1 is a plan view of a raking implement in accordance with the invention connected to the rear of an agricultural tractor, FIG. 2 is a section taken on the line II—II of FIG. 1, FIG. 3 is a section, to an enlarged scale, taken on the line III—III of FIG. 2, FIG. 4 is a section, to an enlarged scale, taken on the line IV—IV of FIG. 1, FIG. 5 is a section, taken on the line V—V of FIG. 4, FIG. 6 is a plan view, to an enlarged scale, of one of the rake members of the implement of FIG. 1, showing the construction of that rake member in greater detail, neighbouring frame parts of the implement being omitted for the sake of clarity, FIG. 7 is a similar view to FIG. 4 but illustrates an alternative construction, FIG. 8 is a plan view generally corresponding to FIG. 1 but illustrating the implement in a working position in which it will function as a side delivery rake, FIG. 9 is a schematic plan view, to a reduced scale, illustrating the implement functioning as a tedder, FIG. 10 is similar to FIG. 9 but illustrates an alternative method of operation as a tedder, FIG. 11 is a similar view to FIGS. 9 and 10 but shows the implement functioning to form a swath or windrow, FIG. 12 is a similar view to FIG. 11 but illustrates the formation of a compact swatch or windrow by the use of an auxiliary swath-forming member, FIG. 13 is a similar view to FIGS. 9 to 12 and illustrates the implement functioning as a side delivery rake to form a swath or windrow by the use of an auxiliary swath board, FIG. 14 is a schematic plan view, to a reduced scale, illustrating the operation of the implement in a working position similar to that illustrated in FIG. 8, FIG. 15 is a schematic plan view, to a reduced scale, illustrating a method of use of the implement in merging two spaced swaths or windrows into a single laterally displaced larger swath or windrow, FIG. 16 is a further schematic plan view illustrating a method of use of the implement as a double swath-turner, FIG. 17 is a scrap plan view of part of one of the rake members of the implement illustrating an alternative tine formation, FIG. 18 is a schematic sectional elevation illustrating an alternative construction for varying the angular settings of the tines of the rake members, FIG. 19 is a plan view corresponding to FIG. 18, FIG. 20 corresponds to FIG. 18 but shows one practical tine setting that can be employed, FIG. 21 is a plan view corresponding to FIG. 20, FIG. 22 substantially corresponds to FIGS. 18 and 20 but illustrates a further alternative construction, FIG. 23 illustrates one practical tine setting that may be used employing the construction of FIG. 22, and FIG. 24 is a plan view corresponding to FIG. 23.

Referring to FIGS. 1 to 6 of the drawings, the implement for the displacement of crop or like material lying on the ground that is illustrated is in the form of a power-driven hay making machine. The machine has a frame 1 that is afforded principally by a substantially horizontal beam 2 and a draw bar 3 that is rigidly and perpendicularly connected to the beam 2 so as to project forwardly from the latter in the same general direction as the intended direction of operative travel of the machine that is indicated in FIG. 1 by an arrow A. The rigid connection between the beam 2 and the draw bar 3 is reinforced by two generally triangular strengthening plates 4 that are located at opposite sides of the draw bar 3 and which are normally substantially horizontally disposed. As seen in plan view (FIG. 1), the draw bar 3 is symmetrical about a vertical plane extending parallel to the direction A and it will be seen from FIG. 1 that the boundaries of the draw bar converge gently towards that plane in the direction A from a location just beyond the leading extremities of the strengthening plates 4. The leading end of the draw bar 3 is turnable about a substantially vertical or at least upwardly extending axis, afforded by a pivotal shaft 5, relative to a coupling member 6. The coupling member 6 is of inverted U-shaped configuration as viewed in the direction A and, near the lowermost free ends of its limbs, is provided with two connection points 7 to which the free ends of the lower lifting links of the three-point lifting device or hitch of an agricultural tractor 8 or other operating vehicle can be pivotally connected. A further connection point is provided at the top of the coupling member 6 and the free end of the upper adjustable lifting link of the same three-point lifting device or hitch can be pivotally coupled to this further connection point in the manner which can be seen in outline in FIG. 1 of the drawings.

The coupling member 6 has a rearwardly projecting extension arm 9 whose free rearmost end is formed with a hole 10. The draw bar 3 is provided at a short distance rearwardly from its leading end with two horizontal fastening plates 11 that are vertically spaced apart from one another by a short distance. The two plates 11 are formed with a pair of vertically aligned holes 12 and a setting arm 13 is turnable between the plates 11 about a vertical pivot 12A that is entered through the aligned holes 12. The end region of the arm 13 that is remote from the pivot 12A is formed with two vertically extending transverse holes 14 that are horizontally spaced apart from one another and it will be noted that the longitudinal axes of the bores which define the holes 14, the longitudinal axis of the pivot 12A and a substantially vertical line passed centrally through the hole 10 are all substantially parallel to one another. A vertical locking pin 10A is provided for entry through the hole 10 and through either chosen one of the two holes 14 and it will be apparent from FIGS. 1 and 8 of the drawings that the hole 14 which is selected for co-operation with the locking pin 10A determines the angular setting of the draw bar 3 about the axis defined by the pivotal shaft 5 relative to the coupling member 6.

A gear box 15 is arranged immediately to the rear of the coupling member 6 with respect to the direction A and is at substantially the same horizontal level as the free lowermost ends of the limbs of said coupling member. The gear box 15 accommodates four toothed pinions 16, 17, 18 and 19 that are disposed in a row with the teeth of each pinion in mesh with those of its neighbours, or both of its neighbours, in the row. Each pinion is rotatable about a corresponding substantially horizontal axis that extends substantially parallel to the direction A and all four of the axes of rotation are contained in a single substantially horizontal plane. A shaft 20 that affords the axis of rotation of the pinion 16 has one of its ends projecting rearwardly beyond the gear box 15 to form a splined or otherwise keyed output shaft of the gear box. A shaft that affords the axis of rotation of the pinion 18 projects both forwardly and rearwardly from the gear box 15, the forwardly projecting end affording a splined or otherwise keyed rotary input shaft 21 of the gear box and the rearwardly projecting end affording a further splined or otherwise keyed rotary output shaft 22 thereof. A third splined or otherwise keyed rotary output shaft 23 of the gear box 15 is afforded by the rearwardly projecting end of the shaft that affords the axis of rotation of the pinion 19. All of the four shafts 20 to 23 which have just been mentioned are constructed and arranged for co-operation with intermediate telescopic transmission shafts having universal joints at their opposite ends, such transmission shafts being of a construction which is known per se. FIG. 1 of the drawings shows the rotary input shaft 21 in driven connection with the power take-off shaft of the tractor 8 by way of an intermediate telescopic transmission shaft 24 of the kind which has just been mentioned.

Two rotary rake members or rake heads 25 and 26 are arranged near the opposite ends of the frame beam 2 and are rotatable about the axes of corresponding parallel shafts 27. The two parallel shafts 27 are normally inclined to the vertical, during the use of the hay making machine, in such a way as to extend upwardly from the ground with a forward inclination relative to the direction A. The length of the beam 2, and thus the perpendicular distance between the axes of rotation that coincide with the axes of the two shafts 27, is variable but can be fixed, as required, in any chosen one of a number of different settings. To this end, the beam 2 is afforded principally by two relatively slidable bar-like portions 28 and 29 (FIGS. 2 and 3 of the drawings), the portion 29 being located at a level a little above that of the portion 28. The portion 28 is afforded by a tube of circular cross-section while the portion 29 is afforded by a tube of square cross-section. Generally rectangular and vertically disposed supporting plates 30 and 31 are secured to the beam portion 28 at opposite sides of the draw bar 3 so as to project upwardly from that portion. Both of the plates 30 and 31 are contained in corresponding substantially vertical planes that extend substantially parallel to the direction A. The tops of the two plates 30 and 31 are interconnected by a mean 32 of inverted channel-shaped cross-section (see FIG. 3). The two plates 30 and 31 are also formed, immediately beneath the connecting beam 32, with square holes which are a close fit around the beam portion 29 that is passed axially through both of them. A block 33 is secured to the top of the connecting beam 32 alongside the plate 31 and is formed with a screw-threaded bore that extends parallel to the longitudinal axes of the beam portions 28 and 29. A spindle support 34 is secured to the top of the beam portion 29 at the end thereof remote from the beam portion 28 and a cranked spindle 35 that has a screw-threaded shank is mounted in the support 34 so as to be rotatable but substantially axially immovable relative thereto. The screw-threaded shank of the spindle 35 is entered through the matchingly screw-threaded bore in the block 33.

Gear boxes 36 are mounted at the relatively remote ends of the beam portions 28 and 29 and have corresponding forwardly projecting rotary input shafts 37 and 38 each of which is provided with splines or other keys (not illustrated) for driven connection with intermediate telescopic transmission shafts of the kind discussed above. The gear boxes 36 accommodate bevel pinions or other transmission members (not visible) by which rotation of the shafts 37 and 38 is transmitted to the two rake members 25 and 26 respectively. When the machine is in use, the output shaft 20 of the gear box 15 is placed in driving connection with the input shaft 37 of the gear box corresponding to the rake member 25 by way of an intermediate telescopic transmission shaft 39 of the kind discussed above. The rotary input shaft 38 of the gear box 36 corresponding to the rake member 26 can, however, be driven by way of a further similar intermediate telescopic transmission shaft 40 either from the output shaft 22 (see FIG. 8) or from the output shaft 23 (see FIG. 1) of the gear box 15. Since the teeth of the pinions 18 and 19 are in mesh with one another, the two shafts 22 and 23 rotate in opposite directions during the use of the machine and the arrangement is such that, when the output shaft 23 is employed as shown in FIG. 1 of the drawings, the two rake members 25 and 26 will revolve in opposite directions C whereas, when the output shaft 22 is used as shown in FIG. 8 of the drawings, the rake members will both rotate in the same direction D, this latter direction being anticlockwise as seen in plan view.

The two rake members or rake heads 25 and 26 are of substantially identical construction and, accordingly, only the rake member 26 will be described in detail. FIGS. 4, 5 and 6 of the drawings show the construction of the rake member 26 and it will be seen that it has a hub 41 that is rotatable around the longitudinal axis 42 of the corresponding shaft 27 with the aid of ball bearings 83 that are spaced apart from one another along said shaft. The shaft 27 itself is non-rotatable and has its upper end rigidly secured to the corresponding gear box 36. The rake member 26 has a felly 43 that is arranged substantially concentrically around the shaft 27, said felly 43 being connected to the hub 41 by four spokes 44 that are spaced apart from one another at 90° intervals around the axis 42 and that extend radially with respect to that axis when the rake member is viewed lengthwise along the axis. The spokes 44 are formed from pieces of sheet iron or other sheet metal and actually are inclined downwardly from the hub 41 to their connections to the felly 43. The felly 43 is of L-shaped cross-section having, in cross-section, a longer substantially horizontally disposed limb and a shorter substantially vertically disposed limb that projects downwardly from the first-mentioned limb.

The rake member 26 has eight groups 45 of hay- or other crop-engaging tines. Each group 45 comprises two outwardly projecting and substantially parallel tines 46 and 47 that are disposed one above the other. The inner ends of the tines 46 and 47 of each group 45 are integrally connected to helical coils 48 that are wound in opposite directions and that are integrally interconnected by a bend that is engaged around a bolt 49. The bolt 49 is entered transversely through a bush 50 and the coils 48 at opposite sides of the bolt 49 are wound around that bush. The bush 50 is rigidly secured to the shorter approximately horizontal limb of a tine holder 51 that is of L-shaped cross-section. The longer upright limb of the holder 51 extends parallel to the longitudinal axis of the bush 50 and is in the form of a flat rectangular plate 52 that abuts against a further flat plate 53 forming part of a housing that is generally indicated by the reference 54. The longitudinal axes of the eight bushes 50 are contained in an imaginary inverted conical surface whose apex substantially coincides with a downward extension of the axis 42. All of the plates 52 and 53 are also substantially parallel to this imaginary inverted conical surface. Each plate 52 has welded to it a bolt or screw-threaded stud 55 which projects through a hole in the corresponding plate 53. Each tine holder 51 and the corresponding tine group 55 can be releasably secured in one of the housings 54 by entering the bolt or stud 55 concerned through the hole in the plate 53 and subsequently mounting a retaining wing nut 56 on the shank of the stud or bolt 55. The plate 53 has a pin or dowel 57 rigidly secured to it so as to project outwardly therefrom (relative to the axis 42) in a direction perpendicular to the plane of the plate 53. The pin or dowel 57 is located at a predetermined distance beneath the hole which receives the bolt or stud 55 and, when a tine holder 51 is mounted in the housing 54 in the manner shown in FIG. 4 of the drawings, the pin or dowel 57 is entered into a hole 58 in the plate 52 of that housing, the distance between the bolt or stud 55 concerned and the hole 58 being the same as the distance between the pin or stud 57 and the hole in the plate 53 that is adapted to receive the bolt or stud 55. Once the wing nut 56 is tightened, the co-operation of the pin or dowel 57 with the hole 58 prevents the tine holder 51 from turning about the axis of the bolt or stud 55 relative to the housing 54. The plate 52 is formed with a further hole 59 at the same distance from the bolt or stud 55 as the hole 58 and at the diametrically opposite side of said bolt or stud from the hole 58. The corresponding tine group 45 can be inverted in position by temporarily removing the wing nut 56, inverting the holder 51 to a disposition in which the pin or dowel 57 co-operates with the hole 59 instead of the hole 58 and subsequently replacing and tightening the wing nut 56.

The top of the housing 54 is rigidly secured to a hollow shaft 60 whose longitudinal axis 61 is parallel to the axis 42 of the corresponding shaft 27. The hollow shaft 60 is turnably mounted in a sleeve 62 rigidly fastened to the approximately horizontal limb of the felly 43. Part of the hollow shaft 60 that projects above the sleeve 62 is surrounded by a further sleeve 63 that is rigidly secured to said shaft. The lower end of the sleeve 63 affords a shoulder by which that sleeve bears against the upper surface of the felly 43. The lower end of the housing 54 is formed with a flange 64 that is inclined to the plate 53 at an angle of less than 90° so as to extend perpendicular to the axes 42 and 61. The flange 64 carries a downwardly projecting pivot pin 65 whose axis is coincident with the axis 61. The pin 65 is entered turnably through a hole in a connecting plate 66 which is rigidly secured to an abutment rim 67 in the form of a tube of circular cross-section and also circular configuration. The general plane of the abutment rim 67 is perpendicular to the axis 42 and its diameter is a little greater than the maximum diameter of the felly 43.

The upright radially outermost rim of the felly 43 has a circular cylindrical plate 68 fastened to it so as to extend downwardly therefrom towards the ground surface. The center line of the cylindrical plate 68 substantially coincides with the axis 42 and regions of its lowermost edge are rigidly secured to the tubular abutment rim 67. The plate 68 is formed with eight regularly spaced apart openings 69 that are each of generally rectangular configuration, the lowermost edges of the openings 69 coinciding with the top of the abutment rim 67. The eight openings 69 are in register with the eight housings 54 and the tines 46 and 47 of the eight groups 45 project outwardly through the openings from said housings. Access can be obtained through the openings 69 to the housings 54 that are located substantially radially inwardly therefrom with respect to the axis 42 and it is possible to reach the wing nuts 56 either by way of the openings 69 or from the inner sides of the plates 53 that are accessible from underneath the abutment rim 67.

The top of each sleeve 63, and thus the corresponding hollow shaft 60, has a steering member 70 rigidly secured to it. As seen in plan view (FIG. 6), each steering member 70 has a shape which would be oblong apart from the lack of two opposite corners. Each member 70 comprises lower and upper parallel plates 71 and 72 both of which extend perpendicular to the axes 42 and 61. The two plates 71 and 72 are integrally or otherwise rigidly interconnected by a third plate 73 that extends substantially parallel to the axes 42 and 61 and it will be seen from FIG. 4 of the drawings that it is the lower plate 71 that is rigidly secured to the upper end of the corresponding sleeve 63. The two plates 71 and 72 are formed with three pairs of substantially vertically aligned holes 74, 75 and 76. Imaginary lines interconnecting the centers of the two holes of each pair are all three parallel to the axes 42 and 61. For the sake of brevity, each of the three pairs of holes 74, 75 and 76 will hereinafter be referred to merely as "holes" 74, 75 and/or 76. A pin 77 having a handle 78 at its upper end can be entered through any chosen one of the holes 74, 75 or 76 and said pin 77 is surrounded, between the plates 71 and 72, by a corresponding sleeve 79 that is turnable about the pin 77 between those plates. Dislodgement of the pin 77 from the plates 71 and 72 is prevented by entering a transverse retaining pin through a bore towards the lower end of the pin 77, said transverse pin being provided with a retaining ring. This arrangement can be seen in outline in FIG. 4 of the drawings but need not be described in detail since such retaining pins are known per se. Eight steering rods 80 have their radially outer ends rigidly secured to the corresponding eight sleeves 79 which sleeves, it will be remembered, can be turnably connected to the corresponding steering members 70 by way of the pins 77 that can be entered through any chosen one of the holes 74, 75 or 76.

The rotary input shaft 38 of the gear box 36 is provided, inside that gear box, with a bevel pinion 81 whose teeth are in driving mesh with those of a larger bevel pinion or crown wheel 82 that is secured to the top of the hub 41 by bolts. The bevel pinion or crown wheel 82 is thus rotatable around the corresponding axis 42 with the hub 41 as a result of the provision of the aforementioned ball bearings 83. The inner race of the lower ball bearing 83 bears against a collar 84 on the corresponding shaft 27 thus preventing downward displacement along that shaft. The hub 41 is provided, towards its outer periphery, with eight pivot pins 85 that are spaced apart from one another at 45° intervals around the axis 42, the longitudinal axes of said pivot pins 85 being parallel to said axis 42. It will be apparent that each pin 85 corresponds to one of the eight tine groups 45 and it will be seen from FIG. 4 of the drawings that said pins 85 project principally in a downward direction from the hub 41 and are turnable in corresponding sleeves 87 welded or otherwise rigidly secured to the lower surface of the hub 41. Each pin 85 is provided, at the lower end thereof that projects from beneath the corresponding sleeve 87, with a guide block 86 so that said block 86 is turnable relative to the corresponding sleeve 87 about the axis of the corresponding pin 85. Each guide block 86 is provided with an internal sleeve 89 defining a bore 88 that is perpendicular to the axis of the corresponding pin 85. The bores 88 slidably receive the corresponding eight steering rods 80 in such a way that the blocks 86 are located between the sleeves 79 at the outermost ends of those rods 80 and further bearing sleeves 90 at the innermost ends thereof.

The bearing sleeves 90 that are secured to the inner ends of the eight steering rods 80 accommodate corresponding shafts 91 each of which has a roller 92 rotatably mounted thereon beneath the sleeve 90 concerned. The axes of rotation of the rollers 92 that are defined by the shafts 91 are parallel to the axes 42 and 61. All eight of the rollers 92 are rotatable in a substantially common plane that is perpendicular to the axis 42, all of them are located between the plate-shaped walls 94 and 95 of a steering member constituted by a cam track 93 of channel-shaped cross-section. A plane containing the upper edges of the walls 94 and 95 of the cam track 93 is located at a level just beneath that of a plane containing the lowermost extremities of the eight blocks 86. Each of the plate-shaped walls 94 and 95 is of right-circular cylindrical configuration with the outer wall 95 of larger diameter arranged with its central axis of curvature coincident with that of the inner wall 94 of smaller diameter, said common central axis of curvature being parallel to the axis 42. The top of the cam track 93 is, of course, open to receive the shafts 91 and roller 92 but its bottom is closed by a circular plate 96 that extends perpendicular to the axis 42. The width of the cam track 93 and the diameter of the rollers 92 are such that said rollers fit closely between the walls 94 and 95 but can roll readily along the length of the circular track.

Two parallel strips 97 are welded or otherwise rigidly secured to the lower surface of the circular plate 96 (see particularly FIG. 5 of the drawings), said strips 97 being located at relatively opposite sides of the corresponding shaft 27. A substantially rectangular plate 98 is a close fit between the two strips 97 and is slidable between them in a direction parallel to their lengths. The flat top of the plate 98 is in close intimate contact with the lower surface of the circular plate 96 and thus will slide in a direction that is parallel to the plane of that annular plate. The lower surface of the plate 98 has two arcuately curved strips 99 rigidly secured to it, the two strips 99 being located at diametrically opposite sides of the corresponding axis 42 with their centers of curvature coincident with that axis and each of them subtending an angle of substantially 90° at that axis. As can be seen in FIG. 5 of the drawings, a straight line joining the two ends of either of the two curved strips 99 has a length which is a little less than the perpendicular distance between the relatively facing surfaces of the two straight strips 97. The plate 98 and the two straight strips 97 are of substantially equal thickness in a direction parallel to the axis 42. An annular setting plate 100 is welded around the shaft 27 immediately beneath the generally rectangular plate 98 and is a close fit between the two curved strips 99 that project downwardly from said plate 98. The setting plate 100 is arranged so as to be turnable relative to the curved strips 99 and thus to the plate 98 which carries them. The diameter of the plate 100 is such that it overlaps the lower edges of the two straight strips 97 to some extent (see FIG. 5).

The annular setting plate 100 is formed with two arcuately curved slots 101 that are located at diametrically opposite sides of the axis 42 with their centers of curvature coincident with that axis and each of them subtending an angle of substantially 90° at that axis. Two pins 102 are welded or otherwise rigidly secured to the plate 98 so as to project downwardly therefrom into the two slots 101, the longitudinal axes of said pins 102 being parallel to the axis 42. The pins 102 may be of sufficient length to project downwardly beneath the plate 100 and, under these circumstances, the downwardly projecting portions thereof are screw-threaded for the reception of co-operating nuts that can then be tightened to clamp the plate 100 in a chosen position against the overlying plate 98.

The circular plate 96 has a central rectilinear slot 103 that is located midway between the two straight strips 97 with its length parallel to both those strips. The corresponding shaft 27 is entered through the slot 103 with a small amount of clearance sufficient to enable relative movement of the shaft 27 and plate 96 to take place along the length of the slot 103. The generally rectangular plate 98 is provided with an extension arm 104 whose free end has a sleeve 105 pivotally connected to it in which sleeve 105 the shank of a cranked spindle 106 is rotatable but substantially axially immovable. A further portion of the shank of the spindle 106 is screw-threaded and is received in a matchingly screw-threaded bush 107, the end of the bush 107 remote from the sleeve 105 being pivotally connected to the annular setting plate 100 in such a way as to be turnable relative to that plate about an axis that is parallel to the axis 42. The plate 98 also carries a second extension arm 108 whose free end is provided with a bearing sleeve 109 in which the shank of a second cranked spindle 110 is rotatable but substantially axially immovable. A block 111 is pivotally connected to the bottom of the circular plate 96 so as to be turnable relative thereto about an axis that extends parallel to the axis 42. The longitudinal axes of the straight shanks of the two spindles 106 and 110 are both spaced from the axis 42 of the shaft 27 and their longitudinal axes are also contained in at least one plane that is substantially perpendicular to the axis 42. Both of said shanks are located at a level beneath that of the lower surface of the annular setting plate 100 and, when the assembly occupies a position similar to that shown in FIG. 5 of the drawings in which both of the spindles 106 and 110 are in place for setting the tine groups 45, the lowermost ends of the two pins 102 do not project beneath the lowermost surface of the setting plate 100.

The parts 96 to 111 inclusive together afford a setting mechanism whose mode of use will become apparent below when a description of the various modes of operation of the machine is reached, However, some preliminary description will now be given to aid in an understanding of the construction and arrangement of the setting mechanism. The annular setting plate 100 is rigidly secured to the shaft 27 which shaft, it will be remembered, is nonrotatable. The rectangular plate 98 can turn about the annular setting plate 100, and thus about the shaft 27, guided by the curved strips 99. As the edges of the plate 98 are located slidably between the straight strips 97 that are fastened to the circular plate 96, it will be evident that the circular plate 96 will turn about the setting plate 100 with the plate 98 upon angular displacement of the latter. Such turning movements are both guided and limited by movement of the pins 102 along the curved slots 101. The circular plate 96, is, however, also rectilinearly displaceable relative to the annular setting plate 100 due to the provision of the slot 103. Upon rotating the handle of the cranked spindle 106, the plates 98 and 96 are turned about the axis 42 relative to the shaft 27 and the annular plate 100 in a direction which is dependent upon the direction of rotation imparted to the spindle 106. Rotation of the crank 110, on the other hand, moves the circular plate 96 and its straight strips 97 rectilinearly relative to the plate 98 and the setting plate 100 that is secured to the shaft 27. The cranked spindle 110 can thus be employed to determine the magnitude of the eccentricity of the circular plate 96 relative to the axis 42 and this adjustment is, in principle, infinitely variable between the two limits imposed by co-operation of the shaft 27 with one or the other end of the slot 103. The cranked spindle 106 is employed to determine the angular setting of the maximum eccentricity of the circular plate 96 about the axis 42 and the shaft 27 or with reference to the frame 1 of the machine. This adjustment is also, in principle, infinitely variable between the limits dictated by co-operation of the pins 102 with the opposite ends of the curved slots 101. The position of the maximum eccentricity of the circular plate 96 with respect to the axis 42 can be expressed angularly around that axis and will hereinafter be called the "phase of the eccentricity." It will, of course, be realised that it is possible to adopt a position of adjustment in which there is no eccentricity at all in which position the "phase of the eccentricity" is meaningless. This position is one in which the shaft 27 is located exactly midway along the length of the slot 103 but it will be noted that even in this position, the cranked spindle 106 can still be operated to adjust the positions of all of the tine groups 45 relative to the remainder of the rake member 26, albeit to the same extent in respect of all eight of those tine groups.

A sector-shaped adjustment plate 112 is mounted at the lowermost end of the shaft 27 so as to extend generally rearwardly from that shaft with respect to the direction A. The adjustment plate 112 has a substantially horizontal shaft 113 pivotally connected to it near the shaft 27, the longitudinal axis of the shaft 113 being perpendicular to the general plane of the plate 112. An arm 114 that is rigid with the shaft 113 projects downwardly and forwardly with respect to the direction A from said shaft to terminate in an axle upon which a ground wheel 115 is rotatably mounted. The axle defines an axis of rotation that is parallel to the axis of the shaft 113. A setting arm 116 is perpendicularly secured to the shaft 113 alongside the plate 112 which plate is formed, close to its rearmost curved edge, with a curved row of holes 117 that are at equal distances from the axis defined by the shaft 113. The setting arm 116 is formed with a single hole that can be brought into register with any chosen one of the holes 117 and a horizontal locking pin 118 can be entered through the single hole in the arm 116 and a chosen one of the holes 117 to retain the ground wheel 115 at a corresponding angular setting about the axis of the shaft 113. It will be apparent that the angular setting that is chosen will determine the level of the axle of the wheel 115 relative to the level of the remainder of the machine. The sector-shaped adjustment plate 112 is secured to a sleeve 119 that is turnable around a lowermost end region of the shaft 27. The front of the sleeve 119 with respect to the direction A carries a substantially horizontal sector plate 120 formed close to its leading curved edge with a row of holes all of which are equally distant from the axis 42 of the shaft 27. The shaft 27 itself is provided, immediately above the sleeve 119, with an arm 121 which, like the sector plate 120, is perpendicular to the axis 42 and whose free end region is formed with a hole that can be brought into register with any chosen one of the holes in the sector plate 120. The arm 121 abuts against the sector plate 120 and a substantially vertical locking pin 122 can be entered downwardly through the hole in the arm 121 and the selected hole in the sector plate 120 to retain the plane of rotation of the ground wheel 115 is a corresponding angular setting relative to the remainder of the machine.

FIGS. 1 to 6 of the drawings show all of the parts 80 and 111 inclusive, with the exception of the parts 81, 82 and 83, located beneath the hub 41 but FIG. 7 of the drawings illustrates a construction in which the setting mechanism and the steering member by which the tine groups 45 are angularly moved or steered during the operation of the machine located wholly or principally above a hub 126. Parts shown in FIG. 7 of the drawings that are similar, or identical, to parts that have already been described with reference to FIGS. 1 to 6 thereof are designated in FIG. 7 by the same reference numerals as have been employed in FIGS. 1 to 6. In the embodiment of FIG. 7, the bevel pinion or crown wheel 82 is fastened to the uppermost end of a sleeve 123 that is arranged rotatably around the shaft 27 with the aid of axially spaced apart upper and lower ball bearings 124. The inner race of the lower ball bearing 124 bears against a collar 84 that is carried by the shaft 27 to prevent downward displacement along that shaft. The lowermost end of the sleeve 123 is integral with, or rigidly secured to, the aforementioned hub 126 which hub is of circular plate-like configuration having its general plane perpendicular to the axis 42. In this embodiment, the eight pins 85 are located principally above the hub 126 with their sleeves 87 and guide blocks 86 in which latter the eight steering rods 80 are axially slidable. The rollers 92 are accordingly disposed above the uppermost extremities of the blocks 86 and are located in the cam track 93 which is of the same construction and shape as has already been described with reference to FIGS. 1 to 6 of the drawings except that it is located in an inverted position as compared with the already described embodiment. The lowermost edges of the walls 94 and 95 of the cam track 93 are thus located at a higher level, considered lengthwise of the axis 42, than are the uppermost extremities of the guide blocks 86. A plate 127 is bolted to the bottom of the gear box 36 and thus occupies a fixed position relative to the frame 1, said plate 127 being contained in a plane that is perpendicular to the axis 42. A circular setting plate 128 is rigidly fastened to the bottom of the plate 127, its center being coincident with the axis 42. Two arcuately curved strips 129 closely engage the circumference of the plate 128, their arrangement being the same relative to that plate as the previously described arrangement of the strips 99 relative to the setting plate 100, The strips 129 are rigidly secured to a generally rectangular plate 130 that is disposed underneath the strips in movably abutting engagment with the overlying setting plate 128. The rectangular plate 130 generally corresponds to the rectangular plate 98 and is turnable with the strips 129 that are rigidly secured thereto about the axis 42 relative to the setting plate 128. The plate 130 carries two pins 131 (equivalent to the pins 102) that are located at diametrically opposite sides of the axis 42 and which extend through arcuately curved slots (equivalent to the slots 101) in the setting plate 128. The upper surface of the circular plate 96 of the cam track 93 is provided with two spaced parallel straight strips 132 that are located at opposite sides of the shaft 27 in the same manner as the previously described straight strips 97. A setting bracket 133 is fastened to the outer convex surface of the cam track wall 95 and is bent-over around the plate 127. The bracket 133 is furnished, in a portion thereof furthest remote from the shaft 27, with a handle pin 134 that is parallel to the axis 42 and, in an upper portion of the bracket 133 that is closer to said shaft 27, a clamping bolt 135 that is formed with a winged head 136 is entered downwardly through a tapped hole in said bracket for adjustable clamping engagement with the upper surface of the plate 127.

The chosen point at which the bracket 133 is clamped to the plate 127 by the bolt 135 determines not only the magnitude of the eccentricity of the cam track 93 relative to the axis 42 but also the previously discussed "phase of the eccentricity." It should, perhaps, be mentioned that, if preferred, the infinite variability, between certain limits, that is provided by furnishing the bolt 135 may be replaced by an arrangement in which any chosen one of a plurality of different fixed settings are possible. This latter arrangement may be provided by forming the plate 127 with a plurality of holes whose positions are predetermined with respect to the axis 42. The top of the bracket 133 may then be provided with a locking pin (not shown) whose tip can be entered through any chosen one of the holes to maintain the setting that corresponds thereto. With this construction, indications of the settings that correspond to the different holes in the plate 127 would be provided as a guide for a user of the machine. In any case, if the bracket 133 is moved purely radially with respect to the axis 42, the cam track 93 is similarly moved with respect to the frame 1, the plate 96 and its strips 132 being displaced rectilinearly under the generally rectangular plate 130. If, on the other hand, the bracket 133 is displaced angularly around the axis 42, the plate 96 and its strips 132 will turn similarly about the axis 42 as the pins 131 move along the curved slots in the setting plate 128 that are equivalent to the previously described slots 101. Radial movement of the bracket 133 alters the magnitude of the eccentricity of the cam track 93 and may even bring that eccentricity to a zero value if the selected ajustment is one in which the shaft 27 is located exactly midway along the slot 103. Angular displacement of the bracket 133 about the axis 42 alters the phase of the eccentricity (as hereinbefore described) and both these adjustements can be made simultaneously by bringing the bolt 135 from one clamping position relative to the plate 127 to another such position or by entering the alternative locking pin (not shown) through a different one of the predetermined position holes (not shown) that may be formed through the hole 127.

The construction, location and mounting of the eight tine groups 45 is identical in the embodiment of FIG. 7 of the drawings to that already described with reference to FIGS. 1 to 6 thereof. However, in the embodiment of FIG. 7, the rake member 26 is not sustained from the ground surface by a wheel but by a profiled annular plate 137. The annular plate 137 is of circular formation when seen in plan view and is of constant cross-section throughout the circle. As can been seen in FIG. 7 of the drawings, the cross-section of the plate 137 presents a downwardly convex surface and is curved upwardly towards its radially outermost edge. The radially inner edge region of the plate 137 is also inclined upwardly but that region is of straight configuration as seen in cross-section. The uppermost edge of the upwardly curved radially outermost region of the plate 137 is located at a level just beneath that of the lowermost ends of the eight pivot pins 65 and also just beneath a felly 138 that is of inverted L-shaped cross-section. The felly 138 replaces the previously described tubular abutment rim 67. The cross-sectional shape of the annular plate 137 is such that, viewed lengthwise of the axis 42, the lowermost and normally ground-engaging portion of the plate 137 is located radially inwardly from its outermost edge by a distance which has a magnitude that is not less than one-tenth and not greater than one-fifth of the maximum radius of the plate 137 measured from the axis 42. The maximum diameter of the annular plate 137 is at least equal to that of the plate 68 or may, as illustrated, be slightly larger. The portion of the plate 137 that is straight (in cross-section) and that is inclined upwardly and radially inwardly from the lowermost normally ground-engaging region thereof has a radial extent with respect to the axis 42 which is equal to substantially three-fifths of the total radial extent of the plate as seen in cross-section. In the embodiment illustrated in FIG. 7, the plate 137 is annular when it is viewed lengthwise of the axis 42 but, in an alternative embodiment which is not illustrated, the plate does not have a central aperture, extends right up to the shaft 27 and is of dished configuration when seen in cross-section. The top of the plate 137 is connected to a pair of inwardly directed supporting arms 139 that extend in diametrically opposite directions with respect to the axis 42 when viewed lengthwise along that axis. The radially inner ends of the two arms 139 are rigidly secured to the opposite sides of a sleeve 140 that slidably surrounds a lower end region of the shaft 27. A number of transverse holes 141 are formed through the region of the shaft 27 that has just been mentioned and the sleeve 140 is formed with a single pair of holes that can be brought into register with any chosen one of the holes 141. A substantially horizontal locking pin 142 is provided for entry through the pair of holes in the sleeve 140 and the chosen hole 141 in the shaft 27 to maintain the rake member 26 at a corresponding working level relative to the ground surface.

In the use of the haymaking machine, the axis 42 will normally be inclined to the vertical by a few degrees as shown in FIG. 7 of the drawings in such a way that the profiled annular plate 137 or equivalent dished plate will contact the ground surface substantially only in a foremost region thereof with respect to the direction A. In an alternative embodiment which is not illustrated, the annular plate 137 may be connected to the shaft 27 so as to be freely rotatable therearound. With such a construction, a sleeve equivalent to the sleeve 140 functions as a rotary bearing and a further sleeve-like stop is arranged thereabove on the shaft 27 in an adjustable position to prevent the plate 137 from moving upwardly with respect to the axis 42 beyond a chosen level. It has been found experimentally that, when an annular plate arranged in the manner which has just been described slides over stubble, that stubble tends to be pressed or rubbed flat against the ground and that the amount of moisture which can then rise from the soil into the cut hay or other crop is significantly reduced. Drying of the hay or other crop that is lying upon the ground is thus both improved and hastened. It will be seen from FIG. 7 of the drawings that the upper edge of the plate 68 is, in that embodiment, provided with an inwardly directed curved rim 143 that is contained in a plane perpendicular to the axis 42. Considered lengthwise of the axis 42, the rim 143 is located at the same level as the top of the hub 126. The hub 126 and the sleeve 123 are connected to the rim 143 by four spokes 144 that all extend radially with respect to the axis 42 and that are spaced apart from one another at 90° intervals around that axis.

It will be apparent from the foregoing description that the cam track 93 of each of the two rake members 25 and 26 can be adjusted in either or both of two different ways, that is to say, in respect of the magnitude of its eccentricity relative to the corresponding axis 42 and in respect of the angular setting around the corresponding axis 42 at which the maximum eccentricity is located (i.e., the "phase of the eccentricity"). Since all eight of the tine groups 45 of each rake member are pivotable about the corresponding axes 61 and are connected by the steering rods 80 to the cam tracks 93, it will be realised that the tine groups 45 themselves are also adjustable in two different ways. The operation of one of the rake members 25 or 26 will now be further described. The corresponding rotary input shaft 37 or 38 is driven from the power take-off shaft of the operating tractor 8 or other vehicle through the intermediary of the telescopic transmission shaft 24, the pinions 16, 17 and 18 or the pinions 18 and 19 or the shaft 21/22 and the telescopic transmission shaft 39 or 40. It will be remembered that the telescopic transmission shaft 40 can be driven from the rotary input shaft 21 either through the intermediary of the two pinions 18 and 19 or directly from the opposite output end 22 of the shaft whose leading end constitutes the rotary input shaft 21. The co-operating pinion 81 and pinion or crown wheel 82 in the corresponding gear box 36 cooperate to produce rotation of the hub 41 (FIG. 4) or 126 (FIG. 7) and the rotation of the hub causes the plate 68 to rotate with the tine groups 45 and their mountings through the intermediary of the spokes 44 or 144 and the felly 43 or 143. As previously mentioned, the axis of rotation 42 will normally be inclined to the vertical by a few degrees in such a way that the lowermost tine 47 (as illustrated) of the leading tine group 45 at any instant with respect to the direction A will be just clear of contact with the ground as shown in FIGS. 4 and 7 of the drawings. It will be evident that the lowermost tines of each group 45 will be further spaced from the ground surface at other angular positions around the corresponding axis 42. Each cam track 93 will occupy a fixed position with respect to the corresponding shaft 27 during the operation of the machine which position will be such that the circular path defined by each cam track will have a fixed magnitude of eccentricity (which, it will be remembered, may be "zero") with respect to the corresponding axis 42 and will also be such that the "phase of the eccentricity" will be fixed except when the magnitude of the eccentricity if "zero" in which case, as previously discussed, the "phase of the eccentricity" does not apply. Assuming each cam track 93 to have been fixed in an eccentric position with respect to the corresponding axis 42, the rollers 92 will move towards and away from that axis causing the steering rods 80 to slide axially to and fro through the sleeves 89 of the blocks 86. As viewed lengthwise of the axis of rotation 42, the longitudinal axes of the straight steering rods 80 are substantially perpendicular to, but spaced from, the corresponding pivotal axes 61 (see FIG. 5) and the axial reciprocation of the steering rods 80 thus causes the tine groups 45 to oscillate about the axes 61 since the tine groups 45 are indirectly connected to the hollow shafts 60 and since these shafts are rocked about the axes 61 by the steering members 70 at their upper ends. The height of each rack member 25 and 26 above the ground surface and thus the height of the tip of the lowermost tine (illustrated as "47") above the ground at the front of that rake member with respect to the direction A can be adjusted by withdrawing the corresponding locking pin 118, displacing the corresponding ground wheel 115 bodily about the axis of the corresponding shaft 113 and replacing the locking pin 118 in a different hole 117. Alternatively, in the embodiment of FIG. 7 of the drawings, the sleeve 140 is retained at a different level along the shaft 27 by entering the locking pin 142 through an alternative hole 141. This moves the fixedly or freely mounted plate 137 upwardly or downwardly relative to the remainder of the corresponding rake member 25 or 26. The construction and arrangement of the cam track 93 and the alternative setting mechanisms therefor have been described above but it is pointed out that, in order to obtain optimum results with the various different operations that the machine can perform, the pins 77 that pivotally interconnect the sleeves 79 at the outer ends of the steering rods 80 and the steering members 70 should be engaged in the holes 74 when the machine is to be used for the direct formation of swaths or windrows, in the holes 75 when the machine is to function as a side delivery rake and in the holes 76 when the machine is to function as a tedder. All that is necessary to perform this adjustment in respect of each tine group 45 is the temporary removal of the corresponding pin 77 by means of its handle 78, angular displacement of the steering member 70 concerned and replacement of the pin 77 when the required hole 74, 75 or 76 is in register with the corresponding sleeve 79.

In the construction that is shown in detail in FIG. 6 of the drawings, the pins 77 are shown co-operating with the holes 74 of the eight steering members 70. FIG. 6 shows only the operation of the rake member 26 and the associated frame parts, gear box and the like are omitted from that FIGURE. The rake member 26 is shown in FIG. 6 of the drawings with its cam track 93 suitably disposed for the implement or machine of which it forms a part to produce a swath or windrow of hay or other cut crop. In FIG. 6, the "phase of eccentricity" is at a location substantially 270° around the axis 42 in the intended direction of rotation B from a line extending forwardly from that axis 42 in the intended direction of operative travel A. The magnitude of the eccentricity and the perpendicular distance between each pin 77 and the corresponding axis 61 (chosen by selecting the holes 74) are such that, as viewed lengthwise of the axis 42 (FIG. 6), the tines 46 and 47 extend substantially radially, or trail very slightly with respect to the direction B, at a location substantially 270° around the axis 42 in the direction B from a line extending radially forward from that axis in the direction A whereas, at a location only substantially 90° around the axis 42 from the imaginary line which has just been mentioned, said tines 46 and 47 are disposed tangentially, or very nearly tangentially, with respect to the felly 43. It will be noted that, at the last-mentioned location,, the substantially tangentially disposed tines 46 and 47 are directed rearwardly from the corresponding housing 54 with respect to the direction B. The tines of groups 45 that are located between the two locations that have just been mentioned occupy progressively more, and progressively less, trailing positions with respect to the direction B and these positions, which are actually constantly changing during the rotation of the rake member, are dependent upon the to and fro rocking movements of the tine groups 45 about the corresponding axes 61. FIG. 6 of the drawings shows the cam track 93 of the rake member 26 adjusted in such a way that the tines 46 and 47 thereof move to and fro between substantially radial and substantially tangential (with respect to the felly 43) dispositions but it is emphasised that this is by no means essential. The magnitude of the eccentricity of the cam track 93 can be reduced to a value which is such that the tines 46 and 47 never become either substantially radially or substantially tangentially disposed, said tines merely rocking to and fro, during the rotation of the member 26, between extreme positions that are well short of those just mentioned. It will be apparent from FIG. 6 of the drawings that a haymaking machine or other raking implement having only a single rack member could have the rake member in one of the forms which has been described with considerable advantage and it is emphasised that haymaking machines and other raking implements of the kind having only a single rake member or rake head are within the scope of the present invention.

FIG. 1 of the drawings shows the frame beam 2 extending substantially perpendicular to the direction A in which position it is maintained by co-operation of the substantially vertical locking pin 10A with the hole 14 in the setting arm 13 that is closest to the pivot 12A. The cam tracks 93 of the two rack members 25 and 26 are adjusted to positions of zero eccentricity with respect to the corresponding axes 42 and the pins 77 at the radially outermost ends of the steering rods 80 co-operate with the holes 76 of the steering members 70. It will be remembered that the holes 76 are normally selected when the machine is to serve as a tedder and it will be seen from FIG. 1 of the drawings that all of the tines 46 and 47 are substantially radially disposed (in plan view) with respect to the corresponding axes 42 or trail only very slightly with respect to the opposite directions of rotation C of the two rake members. The opposite directions of rotation C are produced by employing the output shaft 23 for co-operation with the leading end of the telescopic transmission shaft 40 and it will be noted that said directions are such that the tines 46 and 47 move rearwardly with respect to the direction A in a central region between the axes of rotation of the two rake members 25 and 26.

FIG. 8 of the drawings illustrates an alternative arrangement of the machine in which the locking pin 10A is entered through the hole, 14 in the setting arm 13 that is furthest from the pivot 12A. The frame beam 2 is thus substantially inclined to the intended direction of operative travel A as seen in plan view. The leading end of the telescopic transmission shaft 40 is driven by the output shaft 22 of the gear box 15 so that both of the two rake members 25 and 26 rotate in the same direction D. It will be noted that the cranked spindle 35 (FIG. 2) has been operated to move the two beam portions 28 and 29 lengthwise relative to one another so that the distance between the two axes of rotation 42 in the working position of FIG. 8 of the drawings in somewhat greater than in the working position illustrated in FIG. 1. In the working position of FIG. 1, the tips of the tines 46 and 47 of the two rake members 25 and 26 trace circles that overlap in a central region between the two rake members with the tines passing through that region in "intermeshing" relationship. In the working position illustrated in FIG. 8, on the other hand, the non-circular figures traced by the tips of the tines 46 and 47 of the two rake members 25 and 26 do not overlap each other. Certain points should be noted in this respect. The mounting of the tines 46 and 47 that is shown in the working position illustrated in FIG. 4 of the drawings is seen by the viewer thereof in the intended direction of rotation of the rake member 26 in that working position. The arrangement is such that the tines 46 and 47 can deflect rearwardly, towards the viewer of FIG. 4, from the region of the illustrated bush 50 by virtue of the resilient deflection of the coils 48 that is caused upon movement of the tines 46 and 47 being resisted by hay or other crop which they encounter or by contact with the ground or some obstacle. When the rake member 26 is caused to rotate in the opposite direction D shown in FIG. 8 of the drawings, the tines 46 and 47 would, unless some measures were taken, have to deflect resiliently in an opposite direction which would tend to tighten the coils 48 with the result that the resilient deflectability of the tines would be considerably reduced. Moreover, the tines 46 and 47 normally trail to a greater or lesser extent with respect to the intended direction of rotation of the rake member of which they form a part so that, upon a reversal of that direction of rotation, the tines would be more or less leading with respect to the new direction of rotation and this would nearly always be disadvantageous. In order to avoid these disadvantages upon a reversal of the direction of rotation of the rake member 26, the wing nuts 56 are loosened and the tine holders 51 are turned through 180° about the longitudinal axes of the bolts or studs 55 to bring them to inverted positions as compared with those shown in FIGS. 4 and 7 of the drawings. The pins or dowels 57 will then cooperate with the holes 59 and the wing nuts 56 are retightened to maintain the inverted positions of the tine holders 51 and the tine groups 45 which they carry. The result is that, during rotation in the direction D (FIG. 8), the tine groups 45 are in the same effective positions as are shown in FIGS. 1, 4 and 7 of the drawings for rotation in the direction C except that the two tines 46 and 47 of each group 45 are interchanged as regards their upper and lower dispositions. It will be noted that, in each case, the points at which the tines 46 and 47 are integrally joined to the coils 48 are located rearwardly of the corresponding bushes 50 with respect to whichever direction of rotation C or D has been chosen and for which appropriate adjustments have been made.

In the working position of the machine as a tedder which is illustrated in FIG. 1 of the drawings, all of the tine groups 45 of each rake members 25 and 26 occupy the same fixed (apart from resilient deflections) positions relative to the remainder of the corresponding rake members, that is to say, positions in which they extend substantially radially, or trail slightly, with respect to the directions of rotation C when viewed substantially lengthwise along the axes 42. As previously mentioned, the circles that are traced by the tips of the tines 46 and 47 of the two rake members 25 and 26, as seen in plan view, overlap one another in a region between the two axes 42, the two rake members 25 and 26 being arranged at substantially 22½° out of phase with one another as regards their angular positions about the corresponding axes 42 so that the tines of the two rake members will intermesh, without fouling contact, in the overlapping region between the two axes 42. FIG. 9 of the drawings diagrammatically illustrates the same working position that is shown in FIG. 1 of the drawings but also shows that the effect of the tedding action is to spread the displaced hay or other crop at random throughout a broad strip of land having a width that is substantially equal to at least the combined working width of the two rake members 25 and 26 of the machine. It will be remembered that, in the working position of FIGS. 1 and 9 of the drawings, the two cam tracks 93 are arranged with zero eccentricity relative to the corresponding axes of rotation 42.

FIG. 10 of the drawings shows the machine arranged in the same way as in FIGS. 1 and 9 thereof except that both cam tracks 93 are adjusted to postions in which they have some eccentricity relative to the corresponding axes of rotation 42. The "phases of the eccentricity" of the two rake members 25 and 26 are symmetrical about a vertical plane that contains the longitudinal axis of the draw bar 3, as seen in plan view, and that is parallel to the direction A. The two cam tracks 93 are so arranged that, during rotation of the two rake members 25 and 26 in the opposite directions C, each tine group 45 in substantially radially disposed, or trails to a minimum extent with respect to the direction C, at a location furthest remote from the imaginary vertical plane of symmetry that has just been mentioned. Consequently, the tines 46 and 47 are trailing to their maximum extent with respect to the direction C at the location where those tines intersect, or come very close to, the imaginary vertical plane discussed above. The result of the increased trailing of the tines 46 and 47 in this central region between the two axes 42 is that hay or other crop can be shed slidably from those tines more readily and is thus ejected from the rotating rake members more quickly to produce a narrower strip of tedded crop than in the case of operation with the adjustments of FIG. 9. The frame beam 2 extends substantially perpendicular to the direction A, as seen in plan view, in both the working positions shown in FIGS. 9 and 10 of the drawings and it should be noted that, in both cases, in width of the strip of ground that receives the tedded crop can be varied by increasing or decreasing the distance between the two axes 42 using the cranked spindle 35 whose arrangement has been described in detail with particular reference to FIGS. 2 and 3 of the drawings.

FIG. 11 illustrates a further mode of operation in which the frame beam 2 is substantially perpendicular to the direction A, as seen in plan view, and in which the two rake members 25 and 26 again rotate in the opposite directions C. However, in this case, the magnitude of the eccentricity of the two cam tracks 93 is increased and the substantially summetrical "phase of the eccentricity" as such that, while the tine groups 45 are again substantially radially disposed, or trailing to a minimum extent with respect to the direction C, at locations furthest from the imaginary vertical plane of symmetry discussed above, the tine groups are tangential, or nearly tangential, with respect to the corresponding fellys 43 at locations where those tine groups are closest to the plane of symmetry. The hay or other crop accordingly slides off the tines 46 and 47 very readily in a rearward but central region of the machine to form a swath of crop that is of much smaller width than the strips of crop that are formed when the adjustments of FIG. 9 or FIG. 10 are employed. The width of this swath of crop can be influenced by varying the magnitude of the eccentricity of the two cam tracks 93 so that the tines 46 and 47 are less tangential to the fellys 43 in their locations of closest approach to, or intersection with, the vertical plane of symmetry than illustrated in FIG. 11. The perpendicular distance between the two axes 42 can also be increased, or decreased, as previously described to influence the width of the swath of crop that is formed. A reasonably compact swath can be formed without the use of any auxiliary guide members or the like and the formation of such a swath prevents the hay or other crop from absorbing too much moisture under humid atmospheric conditions. The machine can readily be adjusted to produce a swath whose width matches that of the pick-up mechanism of a self-loading crop-collection vehicle which might be a wagon, trailer or the like.

FIG. 12 of the drawings shows the machine adjusted to operate in exactly the same way as in FIG. 11 except that the rear of the machine with respect to the direction A is provided with a guide member 145 for the hay or other crop that is displaced by the tines 46 and 47. The guide member 145 is connected to the frame 1 of the machine in such a way that, as seen in side elevation, at least part of it is located to the rear of the paths traced by the tips of the tines of both rake members 25 and 26 with respect to the direction A. The guide member 145 comprises upright and rearwardly convergent side surfaces whose upper edges merge gradually into an interconnecting top surface that is convergent downwardly and rearwardly with respect to the direction A. The guide member 145 is of inverted U-shaped cross-section in a vertical plane perpendicular to the direction A, the size of the inverted U becoming slowly but progressively smaller from the front to the rear of the guide member. In the event of it being desirable for the swath that is formed by the machine when working with the adjustment of FIG. 11 to be brought to a very compact cross-sectional configuarion so that it may, for example, subsequently be picked up by a baling machine and when it is also desirable that the swath should have a generally semi-circular cross-sectional configuration, then said swath is passed through the guide member 145 to form it into a windrow having those desirable attributes. It is preferred that the side and top surfaces of the guide member 145 should be formed from a plurality of closely spaced spring steel rods whose leading ends with respect to the direction A are rigidly clamped but the remainders of which rods project generally rearwardly away from their leading ends in an unclamped condition.

FIG. 13 of the drawings illustrates a mode of operation of the machine in which the frame beam 2 again extends substantially perpendicular to the direction A when the machine is viewed in plan. However, in this case, both the rake members 25 and 26 rotate in the same direction D (anti-clockwise as seen in plan view) and the length of the beam 2 is adjusted to bring the axes 42 to a perpendicular distance apart which is such that the approximate circles traced by the tips of the tines 46 and 47 of the two rake members 25 and 26, as seen in plan view, do not intersect each other or do not do so to any considerable extent. It will be remembered that, for rotation in the direction A, the tine groups 45 of the rake member 26 will have been inverted in the manner previously described as compared with the positions thereof that are illustrated in, for example, FIGS. 1, 4, 6 and 7. The pins 77 are arranged to connect the ends of the steering rods 80 to the steering member 70 by way of the holes 75 and it should be particularly noted that the magnitudes of the eccentricity and the phases of the eccentricity of the cam tracks 93 of the two rake members 25 and 26 are not the same. In the case of the rake member 25, the cam track 93 is adjusted in such a way that the tines 46 and 47 of that rake member are most nearly radially disposed, or trailing to a minimum extent with respect to the direction D, in a region of the rake member furthest from the imaginary vertical plane of approximate symmetry of the machine that contains the longitudinal axis of the draw bar 3, as seen in plan view, and extends parallel to the direction A. The tines 46 and 47 are at their maximum trailing inclination to the direction D at a location of the rake member 25 which is foremost with respect to the direction A and it will be seen from FIG. 13 of the drawings that, at said location, the tines are inclined, in plan view, at an angle of approximately 45° to a tangent to the felly 43 at the same location. The result of this arrangement is that hay or other crop engaged by the tines 46 and 47 starts to slide off those tines at the front of the rake member 25 with respect to the direction A with quite a high tangential velocity and is thrown centrifugally towards the rake member 26. The cam track 93 of the rake member 26 is arranged in such a way that the tines 46 and 47 thereof become substantially radially disposed, or trail to a minimum extent with respect to the direction D, at a location around the periphery of the rake member that is closest to the imaginary plane of substantial symmetry of the machine that is mentioned above and that is located substantially beneath the frame beam 2. The tines 46 and 47 become approximately tangentially disposed with respect to the felly 43 of the rake member 26, as seen in plan view, at a location around the rake member which is furthest remote from the plane of symmetry of the machine. The hay or other crop that has been fed to the rake member 26 by the rake member 25, and also further crop displaced by the rake member 26 from its own path of travel is shed from the tines of the rake member 26 generally at the side of that rake member which is furthest remote from the plane of substantial symmetry of the machine at which side, it will be remembered, the tines 46 and 47 are in their maximum trailing disposition relative to the direction of rotation D. Generally speaking, some of the crop is not shed from the tines until those tines pass to the rear of the frame beam 2 with respect to the direction A but it will be seen from FIG. 13 of the drawings that the tines are still steeply trailing with respect to the direction D in this region of the rake member even though they are starting to swing back to approximately radial or minimum trailing dispositions. In this connection, it will be realised that, as the tines 46 and 47 progressively minimise their trailing dispositions with respect to the direction D, the component of the centrifugal force that tends to cause the crop to slide outwardly along the tines progressively increases. It will be seen from FIG. 13 of the drawings that the machine functions as a side delivery rake forming a single swath at the left-hand side of its path of travel. A swath board 146 may, if desired, be connected to the frame 1 of the machine with some settings of adjustment of the maximum eccentricity of the cam track 93 of at least the rake member 26, said swath board 146 being adjustably positioned at a chosen distance to the left of the path of travel of the machine beyond the path that is traced by the tips of the tines 46 and 47 of the rake member 26 during rotation thereof. The use of the swath board 146 gives the formed swath a precise boundary at its left-hand side and it will be noted that the right-hand side of the swath also has a quite clearly defined boundary because the tines 46 and 47 of the rake member 26 are steeply trailing with respect to the direction D at the left-hand side of the member 26 and thus sweep past the right-hand boundary of the swath with a marked smoothing effect. It may be desirable for the speed of rotation of the two rake members 25 and 26 to be lower than the speed which is normally employed in the working positions of FIGS. 1, 9, 10, 11 and 12 of the drawings. Accordingly, the machine may be equipped in a manner which is known per se with a speed reduction mechanism that is conveniently located in front of the gear box 15 with respect to the direction A in connection with the rotary input shaft 21. This speed reduction mechanism may be employed, or left idle, at will and whether or not it is used will depend upon operating conditions such as, for example, the desired speed of travel of the machine over the ground. With a normal fairly fast speed of travel, the mechanism may be used whilst, with a somewhat slower speed of travel, the mechanism will usually not be used so that the rake members will rotate at a faster speed.

FIG. 14 of the drawings illustrates the mode of operation of the machine when adjusted in the manner illustrated in greater detail in FIG. 8. The draw bar 3 is inclined to the direction A and the rake members 25 and 26 both rotate in the same direction D. The magnitudes of the eccentricity and the phases of the eccentricity of the two rake members 25 and 26 are both identical, that is to say, have the same value and are disposed at the same angular settings around the corresponding axes 42. The arrangement of the cam tracks 93 is such that the tines 46 and 47 of the rake member 25 trail to their minimum extent with respect to the direction D at a location around the corresponding axis 42 which is furthest remote from a vertical plane that, in plan view, contains the longitudinal axis of the draw bar 3. The tines trail to a maximum extent with respect to the direction D at their closest approach to the plane which has just been mentioned. In the case of the rake member 26, the tines 46 and 47 thereof trail to a minimum extent at their closest approach to said vertical plane and to a maximum extent in the region of the rake member 26 that is furthest from that plane. The crop that is picked up by the tines 46 and 47 of the rake member 25 is shed therefrom at a location approximately furthest remote from the frame beam 2 in the general direction A and is thrown more or less tangentially towards the front of the rake member 26 at a considerable velocity. The tines of the rake member 26 engage this laterally displaced crop and further crop from the path of travel of the rake member 26 itself and this mixed crop is shed from the left-hand rake member 26 at a location at the side of the rake member which is generally furthest from the vertical plane which contains the longitudinal axis, in plan view, of the draw bar 3. The height of the draw bar 3 above the ground is, of course, sufficient to enable crop to be moved laterally thereunder from the rake member 25 to the rake member 26. The machine functions as a side delivery rake and forms a single swath of crop to the left-hand side of the path of travel of the machine, shedding of the crop from the tines of the rake member 26 taking place in this general location because the tines 46 and 47 of the rake member trail to a maximum extent with respect to the direction D, and are therefore most nearly tangentially disposed with respect to the felly 43, in that location. Since, as seen in plan view, the longitudinal axis of the frame beam 2 is non-perpendicularly inclined to the direction A in the mode of operation illustrated in FIG. 14 of the drawings, the rake member 25 is located further forwardly with respect to that direction than is the rake member 26 with the result that the hay or other crop that is laterally displaced to the left by the rake member 25 is deposited further in front of the rake member 26 than when the machine is adjusted for the mode of operation illustrated in FIG. 13.

FIG. 15 of the drawings shows the machine operating with its various adjustments in the same settings as those that have been described with reference to FIG. 14 but, in FIG. 15, the machine is shown displacing two laterally spaced apart swaths of crop E and F to produce a single larger swath G that is located to the left-hand side with respect to the direction A of both the original swaths E and F. The tractor 8 or other operating vehicle can travel with its ground wheels just beyond the opposite edges of the swath E and it will be realised that the combined swath G is deposited upon a strip of land whose moisture content will be less than the land beneath the swaths E and F due to the moisture-trapping effect of a layer of crop lying upon the ground.

FIG. 16 of the drawings illustrates a mode of operation of the machine which is similar to that of both FIGS. 14 and 15 of the drawings except that, in this case, the frame beam 2 has been adjusted to bring the axes 42 about which the two rake members 25 and 26 are rotatable to a substantially greater perpendicular distance apart than is required for the modes of operation of FIGS. 14 and 15. As can be seen in FIG. 16 of the drawings, the greater perpendicular spacing between the axes 42 corresponding to the two rake members 25 and 26 produces the result that the lying swath F that is displaced laterally by the rake member 25 is passed under the frame beam 2 through the gap between the two rake members 25 and 26 to become a swath J that rests upon ground previously to the left-hand side of that occupied by the original swath F. The rake member 26 acts similarly but independently of the rake member 25 in displacing the lying swath E to the left to become a new swath H that also rests upon ground that was previously clear of crop and at the left-hand side of the original swath E.

FIG. 17 of the drawings illustrates a portion of the rake member 25 provided with tine groups 45 whose tines 46 and 47 are of a modified shape as compared with the tines that have previously been described. The use of the tine groups 45 of FIG. 17 is considered to be particularly advantageous in the rake member 25 when the machine is to function as a side delivery rake or swath turner as is illustrated in, for example, FIGS. 8, 13, 14 or 15 of the drawings. The tines 46 and 47 (the tines 47 being concealed by the tines 46) of the embodiment illustrated in FIG. 17 of the drawings are so shaped that, in plan view, first portions thereof that extend from the connection points of the tines to the remainder of the rake member 25 are arcuately curved, the radius of curvature of these portions being substantially the same as the radius of curvature of the cylindrical plate 68 so that, as illustrated in FIG. 17 in respect of one tine group 45, the tines 46 and 47 can bear substantially concentrically against the outer surface of the plate 68, at least in plan view, when the tine group in question is trailing to its maximum extent relative to the intended direction of rotation K of the rake member 25. The ends of the curved tine portions that are remote from their connections to the remainder of the rake member are integrally connected by bends to shorter portions which, in plan view, are straight. As seen in plan view, an angle of between substantially 100° and substantially 110° is enclosed between the straight tine portions and tangents to the curved tine portions at the integral junctions between those portions. In the use of the rake member 25 when provided with tines of the kind that have been described with reference to FIG. 17 of the drawings, hay or other crop will tend to collect in the obtuse angles that are enclosed between the inner curved and outer straight portions of the tines 46 and 47. The shovel-like tines 46 and 47 will retain the collected crop for a short space of time and that crop will tend to be discharged from a location such that the crop will fall to the ground at a maximum possible distance in front of the beam 2 with respect to the direction A and within the reach of the tines of the other or second rake member 26. The employment of the tines shown in FIG. 17 of the drawings minimises any tendency for the hay or other crop to be thrown clear of the rake member 25 too soon as regards progress of the tines in the direction D or K (FIG. 17) which can possibly occur with the steeply trailing unmodified tines and which results in the prematurely discharged crop falling to the ground out of reach of the tines of the co-operating rake member 26.

The construction that is illustrated in FIGS. 4 and 5 of the drawings may be modified by pivotally connecting the radially inner ends of the steering rods 80 to a ring rotatably mounted around the outermost edge of the circular plate 96. This ring may, if desired, be located at the same level lengthwise of the axis 42 as the plate 96 with the result that the overall height of each rake member can be somewhat reduced as compared with the constructions so far described.

FIGS. 18 and 19 of the drawings illustrate an alternative rake member construction in which the central shaft 27 is hollow and is formed with diametrically opposite slots 147 that extend through the wall of the hollow shaft 27 and lengthwise thereof for a predetermined distance. A setting rod 148 is accommodated axially in the hollow shaft 27, the lowermost end of the setting rod 148 being provided with a substantially radial pin 149 that is a close but slidable fit in the slots 147. The setting rod 148 is movable lengthwise of the axis 42 through the hollow shaft 27 within the limits dictated by abutment of the pin 149 with the lower and upper ends of the slots 147, said rod 148 being movable by control means that is not illustrated in the drawings. A sleeve 150 slidably surrounds the slotted region of the shaft 27 and is fastened to both the opposite ends of the substantially radial pin 149 that is fixed to the setting rod 148. The opposite ends of the pin 149 project beyond the sleeve 150 and have an inner pivotable but non-rotatable portion of a steering member 151 turnably connected to them. As can be seen in the drawings, the steering member 151 also includes an outer portion of annular configuration that is rotatable around the periphery of the inner tiltable portion thereof. The whole steering member 151 is of generally circular configuration and its center coincides with the axis 42.

The outer rotatable portion of the steering member 151 is provided at 45° intervals around its center with eight steering rods 152 whose radially inner ends are connected to the periphery of the steering member 151 by universal "ring and hole" couplings 153 or by other equivalent couplings such as ball and socket joints. The radially outer ends of the rods 152 are connected by similar couplings 154 to the ends of short steering arms 155. Each steering arm 155 has its opposite end connected to a corresponding pivotal shaft 156 that is mounted in the felly 43 of the rake member so as to be rockable about its own axis which axis is parallel to the axis 42. The tine groups 45 are connected to the shafts 156 in a manner which may be similar to the indirect connection thereof to the hollow shafts 60 that has already been described. A semi-circular setting member 157 has its opposite ends fastened to the inner portion of the steering member 151 at one side of the sleeve 150 in such a way that its general plane is perpendicular to that of the steering member 151 and parallel to the axis 42. The semi-circular setting member is formed with an arcuately curved slot 158 whose center of curvature is coincident with the longitudinal axis of the pin 149. The setting member 157, together with the annular steering member 151, can be retained in any one of an infinite number of angular settings about the axis of the pin 149 between the limits dictated by the opposite ends of the slot 158 by tightening a screw-threaded clamping member 159 that has a part entered through the slot 158 and which, when tightened, temporarily clamps the setting member 157 against a further part thereof that is rigid with the sleeve 150.

The operation of the tine steering mechanism, or mechanism for pivoting the tines to and fro, that is illustrated in FIGS. 18 to 21 of the drawings will now be described. Upon moving the setting rod 148 axially upward through the hollow shaft 27 by the operation of control means that is not illustrated, the pin 149 is similarly moved upwardly along the diametrically opposite slots 147. The sleeve 150, the steering member 151, the setting member 157 and the clamping member 159 all move upwardly along the shaft 27 with the pin 149 so that the steering rods 152 are brought to positions such as those indicated in broken lines by the reference 152A in FIG. 18 of the drawings. Since the rods 152 are of fixed length, the steering arms 155 and all of the tine groups 45 will be turned about the axes of the shafts 156 into positions such as those indicated in FIG. 19 of the drawings in broken lines for five of the tine groups 45 only. It will thus be seen that it is possible to change the trailing disposition of all eight of the tine groups 45, in common, with respect to the intended direction of rotation K (FIG. 19) of the rake member concerned. The extent of the trailing disposition is governed by the chosen axial position of the setting rod 148 lengthwise of the axis 42. This adjustment can, when required, be employed in conjunction with the further adjustment which will be described below.

Upon loosening the clamping member 159, the steering member 151 can be turned about the pivotal axis defined by the pin 149 within the limits set by the two ends of the slot 158. When a desired inclined position of the steering member 151 with respect to the axis 42 has been attained, the clamping member 159 is retightened and the general plane of the steering member 151 is retained in a position such as that illustrated by way of example in FIGS. 20 and 21 of the drawings. In this inclined position of the steering member 151, those tine groups 45 that are connected to rods 152 whose longitudinal axes are approximately in line with the axis of the pin 149 are not deflected at all, or only to a minimum extent, from positions in which, viewed lengthwise of the axis 42, the tines of the groups are substantially radially disposed or are trailing with respect to the direction K to only a very slight extent. On the other hand, those tine groups 45 that, at the same instant, are connected to rods 152 that, viewed lengthwise of the axis 42 (FIG. 21), are substantially perpendicular to the length of the pin 149 are deflected to a maximum trailing extent with respect to the direction of rotation K. It will be evident that the tine groups 45 rock to and fro about the axes defined by the pivotal shafts 156 between the two extreme positions which have just been described and that they will accordingly occupy angular settings somewhere between those two extreme positions as they progress around the axis 42 from one described extreme position to the other. FIG. 21 of the drawings indicates the intended direction of operative travel of the machine or implement of which the illustrated rake member forms a part by an arrow L and the axis of the pin 149 is so disposed with respect to the direction L that the tines 46 and 47 of the groups 45 occupy angular settings when they are at the front of the rake member with respect to the direction L that are most advantageous for contacting and picking up hay or other crop. As shown in FIG. 21 of the drawings, the hay or other crop would have to leave the illustrated rake member from a right-hand region thereof and it will be seen that, in this region, the tines of the groups 45 occupy substantially their maximum angularly trailing dispositions with respect to the direction K which dispositions are such that the tines are nearly tangential to the felly 43 as viewed lengthwise of the axis 42. The hay or other crop will slide readily off the tines when they are disposed in this way. It will be realised that the magnitude of the angularly trailing disposition with respect to the direction K of the tines of the groups 45 in the "shedding" region of the rake member that has just been discussed is influenced by the relationship between the length of each rod 152 and the perpendicular distance between the axis of each shaft 156 and the corresponding coupling 154. Both these distances are, of course, fixed as required during the manufacture of the machine or implement.

If, with the adjustment setting illustrated in FIGS. 20 and 21 of the drawings, the pin 149 should be moved upwardly as shown in FIG. 20 along the slots 147 by the rod 148, the trailing disposition of the tine groups 45 with respect to the direction K that are located at the right-hand side of the rake member as related to the direction L (FIG. 21) will be increased while the trailing disposition of those tine groups that are located at the opposite left-hand side of the rake member with respect to the direction L will be reduced. The reason for this will be readily apparent from FIG. 20 of the drawings in which it will be seen that upward movement of the pin 149 along the slots 147 will bring the right-hand rod 152 that is visible in that FIGURE to a position in which it is more steeply inclined to a line extending radially from the axis 42 whereas the rod 152 is shown at the left-hand side of the shaft 27 will become less steeply inclined to a line extending radially from the axis 42. This increases the degree of adjustability of the tine groups 45 during the use of the machine or implement and it will, of course, be realised that tilting the general plane of the steering member 151 in an opposite direction about the pin 149 to that shown in FIGS. 20 and 21 of the drawings would exert a symmetrically opposite influence upon the tine groups at the two sides of the rake member with respect to the direction L as compared with the effect that has just been described.

When using a rake member constructed in the manner that has been described with reference to FIGS. 18 to 21 of the drawings, it is not necessary to make alternative connections between the steering member 151 and the shafts 156 in the manner that has been described in connection with the preceding embodiments by employing the pins 77 and the holes 74, 75 and 76. This operation is, it will be remembered, required in most, but not all, cases when changing the mode of operation of a haymaking machine or other implement having at least one rake member of one of the kinds described with particular reference to FIGS. 4 to 7 inclusive of the drawings. FIG. 22 of the drawings illustrates a further alternative tine steering mechanism in which a steering member 160 is used. The steering member 160 includes a central circular portion that is tiltable about the axis defined by the pin 149 but is not rotatable. The steering member 160 also includes an outer frusto-conical portion whose upper end of smallest diameter rotatably engages the periphery of the inner tiltable but non-rotatable portion.

Although the slots 147 are not shown in FIGS. 22 to 24 of the drawings, the pin 149 may again be arranged so as to be movable lengthwise along the shaft 27 carrying with it the sleeve 150, the setting member 157, the clamping member 159 and the steering member 160. It is by no means essential that the steering member 160 should be of generally frusto-conical configuration and it could, for example, be of part-spherical or part-hyperbolic configuration. In the illustrated embodiment, the inner ends of the steering rods 152 are again connected by the "ring and hole" couplings 153 or ball and socket joints or other equivalent universal couplings to the central steering member, and, in the case of the steering member 160, to locations close to the lowermost maximum diameter end of the rotatable portion thereof. All of the couplings 153 are contained in a plane that is perpendicular to the central axis of the frusto-conical steering member 160, this plane being located at a predetermined distance beneath the axis of the pin 149 as illustrated in FIG. 22 of the drawings. It should, however, be noted that it is possible to connect the couplings 153 movably to the steering member 160 in such a way that each of them can be moved individually to different settings upwardly and downwardly along the frusto-conical surface of that member. With such a construction, it is possible to locate the general plane which contains all of the couplings 153 at different distances from the axis of the pin 149 and it is even possible to position the couplings 153 in a way in which they are not all contained in a substantially common plane so that some tine groups 45 will be moved with respect to the felly 43 in different ways to other groups during the operation of the machine or other implement of which the rake member forms a part.

Upon retaining the plane of rotation of the steering member 160 in a setting such as that illustrated by way of example in FIGS. 23 and 24 of the drawings, all of the couplings 153 will be displaced with respect to the axis 42 as compared with the positions thereof that are shown in FIG. 22 of the drawings. This mutual displacement is due to the perpendicular spacing between the axis of the pin 149 and the plane which, in the position of adjustment shown in FIGS. 23 and 24 of the drawings, contains all of the couplings 153. In the embodiment of FIGS. 18 to 20 of the drawings, the general plane containing all the couplings 153 also contains, or is very close to, the axis of the pin 149 so that those couplings 153 which are substantially in line with that axis are not displaced to any appreciable extent, if at all, by tilting that general plane which, in the embodiment of FIGS. 18 to 21 of the drawings, is substantially coincident with the plane of rotation of the outer rotary portion of the steering member 151. FIG. 24 of the drawings indicates the intended direction of rotation of the illustrated rake member by an arrow M and the intended direction of travel of the haymaking machine or other implement of which that rake member forms a part by an arrow N. It will be remembered that the plane of rotation of the whole rake member will normally be slightly inclined to the horizontal in such a way that the tines of its tine groups 45 will make their closest approach to the ground in a foremost, or nearly foremost, region of the rake member with respect to the direction N. With the illustrated adjustments, the tine groups 45 are substantially radially disposed with respect to the axis 42, or are trailing to a minimum extent with respect to the direction M, as they approach in the direction M the foremost region of the rake member with respect to the direction N. The tines are thus correctly disposed for contacting and picking up hay or other crop with optimum efficiency. As the tine groups 45 pass onwardly in the direction M to the right-hand side of the shaft 27 with respect to the direction N, they become progressively more trailing relative to the direction M until, at the right-hand side, as illustrated in FIG. 24, of the rake member, they are trailing to a maximum extent which is such as to dispose them nearly tangentially relative to the felly 43. The tines are thus correctly disposed for shedding crop with optimum efficiency in this region of the rake member and it will be realised from the earlier description and drawings that the rake member is shown in FIGS. 23 and 24 of the drawings suitably adjusted for the formation of swaths of hay or other crop. It is emphasised again that a haymaking machine or other implement in accordance with the invention may be furnished with only a single rake member and it will be realised that such a single rake member constructed in accordance with the embodiment of FIGS. 22 to 24 of the drawings would, in the position of adjustment shown in FIGS. 23 and 24, be employed primarily in the formation or lateral displacement of swaths.

Alteration of the angular setting of the frusto-conical steering member 160 about the axis of the pin 149 employing the setting member 157 and the clamping member 159 will alter the angular locations of the extreme positions of the rocking movements of the tine groups 45 about the axes defined by the shafts 156 without changing the amplitudes of those rocking movements. If all of the couplings 153 are changed in position by moving them identical distances towards, or away, from a plane that is perpendicular to the central axis of the frusto-conical steering member 160 and that contains the axis of the pin 149, then all of the couplings will be re-located in a new general plane that is parallel to the plane which has just been mentioned and the magnitudes of the rocking movements of the tine groups 45 about the axes of the shafts 156 will be increased or reduced with a consequent displacement of at least one of the extreme positions of each such rocking movement. It is pointed out again that it is not absolutely essential that the steering member 160 should be adjusted in such a way that all of its couplings 153 are contained in a single plane that is perpendicular to the central axis of the member. It is quite possible to retain the couplings 153 at different levels on the frusto-conical surface of the member 160 relative to the centralaxis of that member and operating circumstances can occur in which this possibility for adjustment is advantageous. The steering member 160 can be placed in a position in which its central axis substantially coincides with the axis 42 and in which all of the couplings 153 are contained in a single plane that is substantially perpendicular to the substantially coincident axes that have just been mentioned. In such a position of adjustment, which is shown in FIG. 22 of the drawings, the tine groups 45 are not steered or rocked at all about the axes of the shafts 156 and maintain constant more or less trailing positions with respect to the direction of rotation M throughout a complete revolution of the rake member. A position of adjustment of this kind can advantageously be used in, for example, tedding operations. It will also be remembered that the steering or rocking of the tine groups 45 can be influenced in a similar manner to that previously described in connection with FIGS. 18 to 21 of the drawings by displacing the steering member 160 lengthwise of the axis 42 employing the co-operating pin 149 and slots 147 which latter are not shown in FIGS. 22 to 24 of the drawings.

It will be evident from the foregoing description and from FIGS. 22 to 24 of the drawings that a very large number of potential adjustments of the tine groups 45 are possible such adjustments including variations of the extreme positions of the rocking movements about the axes of the shafts 156 which they can make during each revolution of the rake member, the magnitudes of those rocking movements and the possibility of an individual adjustment for each of the eight tine groups 45 by retaining the corresponding couplings 153 in individual locations relative to the surface of the setting member 160. The range of possible uses of a haymaking machine or other implement having one or two such rake members that are rotatable in the same or opposite directions is considerably greater than with conventionally constructed haymaking machines or other raking implements. It should also be noted that a haymaking machine or other implement in accordance with the invention may include more than two rake members of one of the kinds that have been described and that such machines may have a large working width and be versatile to an extent which will enable them to be adjusted to tackle all likely hay and other crop displacing operations. It is pointed out again that the embodiments that have been described with reference to FIGS. 18 to 24 of the drawings do not require an operation similar to the re-connection of the outer ends of the steering rods 80 to alternative ones of the holes 74, 74 and 76 when changing from one mode of operation to another as is needed with the embodiments of FIGS. 1 to 17 of the drawings. Each of the rake members or rake heads that has been described has included a felly but it is emphasised that this is not essential. The steerable or rockable tine groups 45 can equally well be coupled to spokes that are not interconnected by a felly. Furthermore, each of the rake members or rake heads that has been described has a construction in which, as viewed lengthwise of the axis of rotation thereof, the tine groups 45 project more or less radially outwardly. The various possibilities for steering or rocking the tine groups 45 during rotation of the rake members can, how-ever, equally well be applied to rake members or rake heads having tines that are orientated principally in a downward direction from their connection points to the remainders of the corresponding rake members towards the ground surface. All that is required to enable the various tine steering mechanisms that have been described and illustrated to be applied to rake members or rake heads having such downwardly directed tines is a minor modification of the shape of the parts that interconnect the steering rods 80 or 152 and the downwardly directed tine groups that, with such a construction, would correspond to the described tine groups 45.

Although certain features of the implements for the displacement of crop or like material lying on the ground that have been described and/or illustrated in the accompanying drawings will be set forth in the following claims as inventive features, it is emphasised that the invention is not necessarily limited to those features and that it includes within its scope all of the parts of each such implement that has been described and/or illustrated both individually and in various combinations.

What we claim is:

1. A raking implement for displacing crop lying on the ground comprising a mobile frame and at least one rake device supported on the frame, said device being rotatable on shaft means about a non-horizontal axis and having rake elements that are movable into alternative crop working positions with respect to said axis, steering means on said implement connected to said elements to move the same, said steering means being adjustable to a more or less eccentric position relative to said axis, said steering means comprising an adjustable member that is movable to vary the magnitude of its eccentricity relative to said axis and said steering member being turnable to change its angular location around said axis to vary the phase of maximum eccentricity of said steering member during each rotation of the rake device, whereby the working positions of said rake elements can be changed during each revolution, locking means associated with said steering means for maintaining any chosen setting of the magnitude or phase eccentricity of said member.

2. An implement as claimed in claim 1, wherein said steering member is displaceable in a direction substantially perpendicular to said axis.

3. An implement as claimed in claim 2, wherein adjustment means is connected to said steering member to move same substantially rectilinearly and in said perpendicular direction.

4. An implement as claimed in claim 3, wherein said steering member is pivotable around said axis.

5. An implement as claimed in claim 1, wherein said steering member is pivotable about an upwardly extending axis that intersects said first mentioned axis.

6. An implement as claimed in claim 1, wherein said rake device has tines and said steering member is adjustable to a position relative to said axis, whereby, during rotation of said rake device, each tine remains in a substantially fixed position relative to the remainder of said rake device.

7. An implement as claimed in claim 1, wherein said steering member is of a substantially rigid unitary construction.

8. An implement as claimed in claim 7, wherein there are at least two co-operating rake members mounted side by side on said frame.

9. An implement as claimed in claim 8, wherein the perpendicular distance between the axes of rotation of said two rake members is adjustable.

10. An implement as claimed in claim 8, wherein said two rake members are driveable to rotate in opposite directions during operation.

11. An implement as claimed in claim 8, wherein said two rake members are driveable to rotate in the same directions during operation.

12. An implement as claimed in claim 8, wherein a substantially horizontal line perpendicularly interconnecting the axes of rotation of said two rake members is inclined to the direction of travel of said implement.

13. An implement as claimed in claim 8, wherein each of said two rake members has a respective steering member, said two steering members being adjustable independently of one another.

14. An implement as claimed in claim 13, wherein each steering member and its respective elements are positioned to operate as a crop tedding or like crop spreading implement.

15. An implement as claimed in claim 13, wherein each steering member and its respective elements are positioned to operate to form swaths or windrows of cut crop.

16. An implement as claimed in claim 15, wherein said steering members are positionable to move said elements into a side delivery rake position and form a single swath or windrow of crop substantially at one lateral side of the path of travel of the implement.

17. An implement as claimed in claim 1, wherein said rake device has groups of tines and said groups are secured to corresponding supports positioned around said axis.

18. An implement as claimed in claim 17, wherein each group has tines located one above the other which project more or less radially outwardly with respect to said axis of rotation.

19. An implement as claimed in claim 18, wherein said tines extend substantially in a downward direction towards the ground during operation.

20. An implement as claimed in claim 19, wherein said groups are connected to a hub of the rake device solely by spokes.

21. An implement as claimed in claim 19, wherein the tines of each group are connected to their corresponding supports by resilient coils.

22. An implement as claimed in claim 19, wherein the tines of each group are mounted with their corresponding support to be turnable about an upwardly extending axis located between the outermost tines of that group through a predetermined angle relative to the remainder of said rake device, retaining means on said device to secure the tines and their support in predetermined settings about said upwardly extending axis.

23. A raking implement for displacing crop lying on the ground comprising a mobile frame and at least one rake device supported on the frame, said device being rotatable on shaft means about a non-horizontal axis and having rake elements that are movable into alternative crop working positions with respect to said axis, steering means on said implement connected to said elements to move the same, said steering means being adjustable to a more or less eccentric position relative to said axis, said steering means comprising an adjustable member that is movable to vary the magnitude of its eccentricity relative to said axis, said steering means being adjustable to a central non-eccentric position relative to said axis and locking means associated with said steering means for maintaining said member in that position.

24. A raking implement for displacing crop lying on the ground comprising a mobile frame and at least one rake device supported on the frame, said device being rotatable on shaft means about a non-horizontal axis and having rake elements that are movable into alternative crop working positions with respect to said axis, steering means on said implement connected to said elements to move the same, said steering means being adjustable to a more or less eccentric position relative to said axis, said steering means being displaceable lengthwise of said axis, whereby said elements are moved to change their working positions during operation when said steering means is adjusted.

25. An implement as claimed in claim 24, wherein said steering means is pivotable about a pivot axis that is inclined to said first mentioned axis.

26. An implement as claimed in claim 25, wherein said pivot axis is defined by pin means and said steering means is tiltable about said pin means to vary the phase of maximum eccentricity of said steering means during each rotation of the rake device.

27. An implement as claimed in claim 25, wherein said first-mentioned axis is defined by an upwardly extending shaft and said steering means is slideable along the length of said shaft to vary the magnitude of eccentricity from neutral to a position in which the elements are pivoted to different working positions.

28. An implement as claimed in claim 24, wherein said rake device has tines and a portion of said steering means controls the working positions of said tines about pivotal axes, said axes being of non-circular and/or non-annular configuration.

29. An implement as claimed in claim 28, wherein said portion has an external surface of non-cylindrical shape.

30. An implement as claimed in claim 29, wherein said portion has an external surface of conical or frustoconical shape.

31. An implement as claimed in claim 30, wherein said tines are mounted in groups around said axis and are pivotable individually and in groups by means located at equal distances from the tip of said surface.

32. An implement as claimed in claim 30, wherein said tines are mounted in groups around said axis and are pivotable individually and in groups by means located at dissimilar distances from the tip of said surface.

33. An implement as claimed in claim 30, wherein said steering means is pivotable about an upwardly extending axis and the tip of said surface is spaced from said last mentioned axis.

34. A raking implement for displacing crop lying on the ground comprising a mobile frame and at least one rake device supported on the frame, said device being rotatable on shaft means about a non-horizontal axis and having rake elements comprising tines that are turnably mounted on a circular felly of said device, said tines being turnable to and from substantially radial and tangential extreme positions with respect to said felly, said tines being interconnected to slidable steering rods having their inner ends mounted on roller means and said roller means riding in a track which surrounds said shaft means, said track being adjustable about said shaft means to vary the path of said roller means during the rotation of said device, whereby said steering rods are caused to slide and said tines are turned between said extreme positions during operation.

35. A raking implement for displacing crop lying on the ground comprising a mobile frame and at least one rake device supported on the frame, said device being rotatable on shaft means about a non-horizontal axis and having tines that are movable into alternative crop working positions with respect to said axis, a ground engaging annular member being rotatably connected to said shaft means to support said rake device and the connection of said annular member to said shaft means being adjusted to vary the working heigth of said tines with respect to the ground, said axis being inclined to the vertical, whereby a portion of said annular member contacts the ground and said member is rotated continuously during operation.

36. An implement as claimed in claim 35, wherein said annular member laterally extends from said axis to contact the ground and the contact surface of the annular member is located in front of the point of intersection of said axis of rotation with the ground with respect to the direction of travel.

37. An implement as claimed in claim 35, wherein the cross-section of said annular member comprises an arcuately curved portion.

38. An implement as claimed in claim 37, wherein said curved portion is the point of contact of said annular member with the ground and is spaced from the outer circumference of the annular member by a distance of about one-tenth to one-fifth the radius of said circumference.

39. An implement as claimed in claim 35, wherein the diameter of said annular member is approximately equal to the diameter of said rake device.

40. A raking implement for displacing crop lying on the ground comprising a mobile frame and at least one rake device supported on the frame, driving means connected to rotate said device in either of two opposite directions about a non-horizontal axis, said device being rotatably mounted on shaft means and having rake elements that are movable into alternative crop working positions with respect to said axis, steering means on said implement connected to said elements to move the same into said positions, said rake elements comprising groups of tines mounted on corresponding supports and each group of tines including vertically spaced apart tines that normally extend outwardly from said axis in trailing position with respect to the direction of rotation of said device, said supports being turnable about axes that extend substantially parallel to the longitudinal axes of said tines to reverse the relative vertical positions of the tines of each group when the direction of rotation of said device is changed.

41. An implement as claimed in claim 40, wherein the tines of each group are contained in upwardly inclined planes.

42. An implement as claimed in claim 40, wherein the axes about which the tine groups can be turned, are located substantially centrally between the outermost tines of each group.

43. An implement as claimed in claim 40, wherein the extreme predetermined angle about which said tine groups can be turned is about 180°.

44. An implement as claimed in claim 40, wherein said tine groups are pivotable about downwardly inclined connections.

* * * * *